US009443292B2

(12) United States Patent
Zimmer

(10) Patent No.: US 9,443,292 B2
(45) Date of Patent: Sep. 13, 2016

(54) BLIND DEFRINGING FOR COLOR IMAGES

(71) Applicant: Apple Inc., Cupertino, CA (US)

(72) Inventor: Mark Zimmer, Aptos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/726,356

(22) Filed: May 29, 2015

(65) Prior Publication Data
US 2015/0348244 A1 Dec. 3, 2015

Related U.S. Application Data

(60) Provisional application No. 62/005,989, filed on May 30, 2014.

(51) Int. Cl.
G06K 9/00 (2006.01)
G06T 5/00 (2006.01)
G06T 3/40 (2006.01)

(52) U.S. Cl.
CPC ............ G06T 5/003 (2013.01); G06T 3/4015 (2013.01); G06T 2207/10024 (2013.01); G06T 2207/20012 (2013.01)

(58) Field of Classification Search
USPC ....... 382/167, 162, 165, 166, 128, 173, 232; 348/188, 254; 358/1.7, 3.24; 433/201.1, 213, 214
See application file for complete search history.

(56) References Cited

U.S. PATENT DOCUMENTS

| 7,762,814 B2* | 7/2010 | van der Zel | A61C 1/084 433/201.1 |
| 7,835,569 B2* | 11/2010 | Marcu | H04N 1/603 382/162 |
| 7,893,975 B2* | 2/2011 | Zimmer | H04N 1/407 348/188 |
| 7,965,411 B2* | 6/2011 | Suzuki | G06K 15/02 358/1.7 |
| 2010/0135588 A1 | 6/2010 | Au | |
| 2012/0051730 A1 | 3/2012 | Cote | |
| 2012/0082380 A1 | 4/2012 | Fujiwara | |
| 2014/0193069 A1 | 7/2014 | Kim | |

* cited by examiner

Primary Examiner — Anh Do
(74) Attorney, Agent, or Firm — Blank Rome LLP

(57) ABSTRACT

This disclosure pertains to novel devices, methods, and computer readable media for performing "blind" color defringing on images. In one embodiment, the blind defringing process begins with blind color edge alignment. This process largely cancels every kind of fringe, except for axial chromatic aberration. Next, the process looks at the edges and computes natural high and low colors to either side of the edge, attempting to get new pixel colors that aren't contaminated by the fringe color. Next, the process resolves the pixel's estimated new color by interpolating between the low and high colors, based on the green variation across the edge and the amount of green in the pixel that is being repaired. Care is taken to prevent artifacts in areas that generally do not fringe, like red-black boundaries and skin tone. Finally, the process computes the final repaired color by using luminance-scaling of the new pixel color estimate.

20 Claims, 25 Drawing Sheets
(15 of 25 Drawing Sheet(s) Filed in Color)

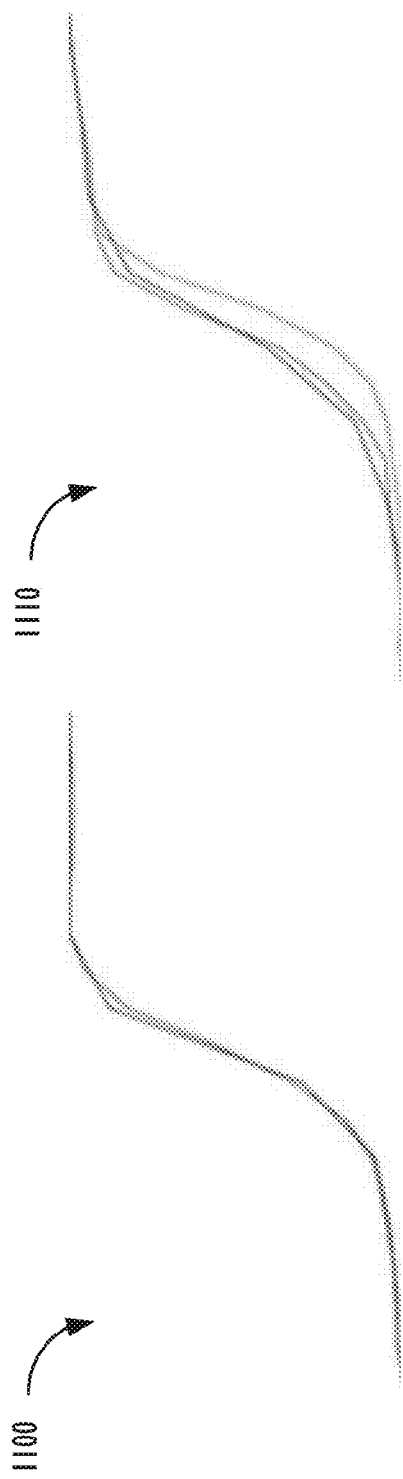
FIG. 11A
FIG. 11B
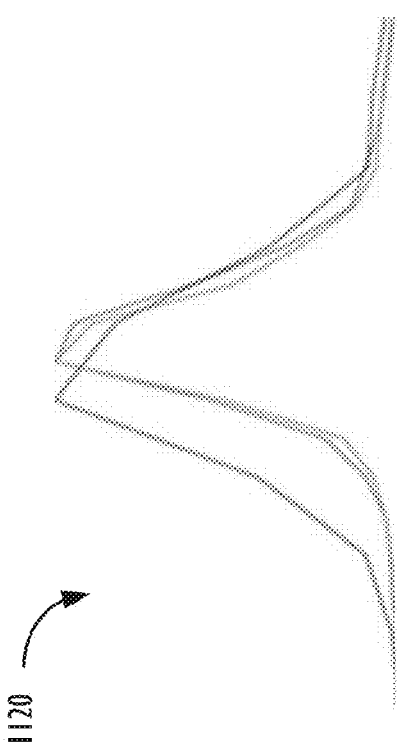
FIG. 11C

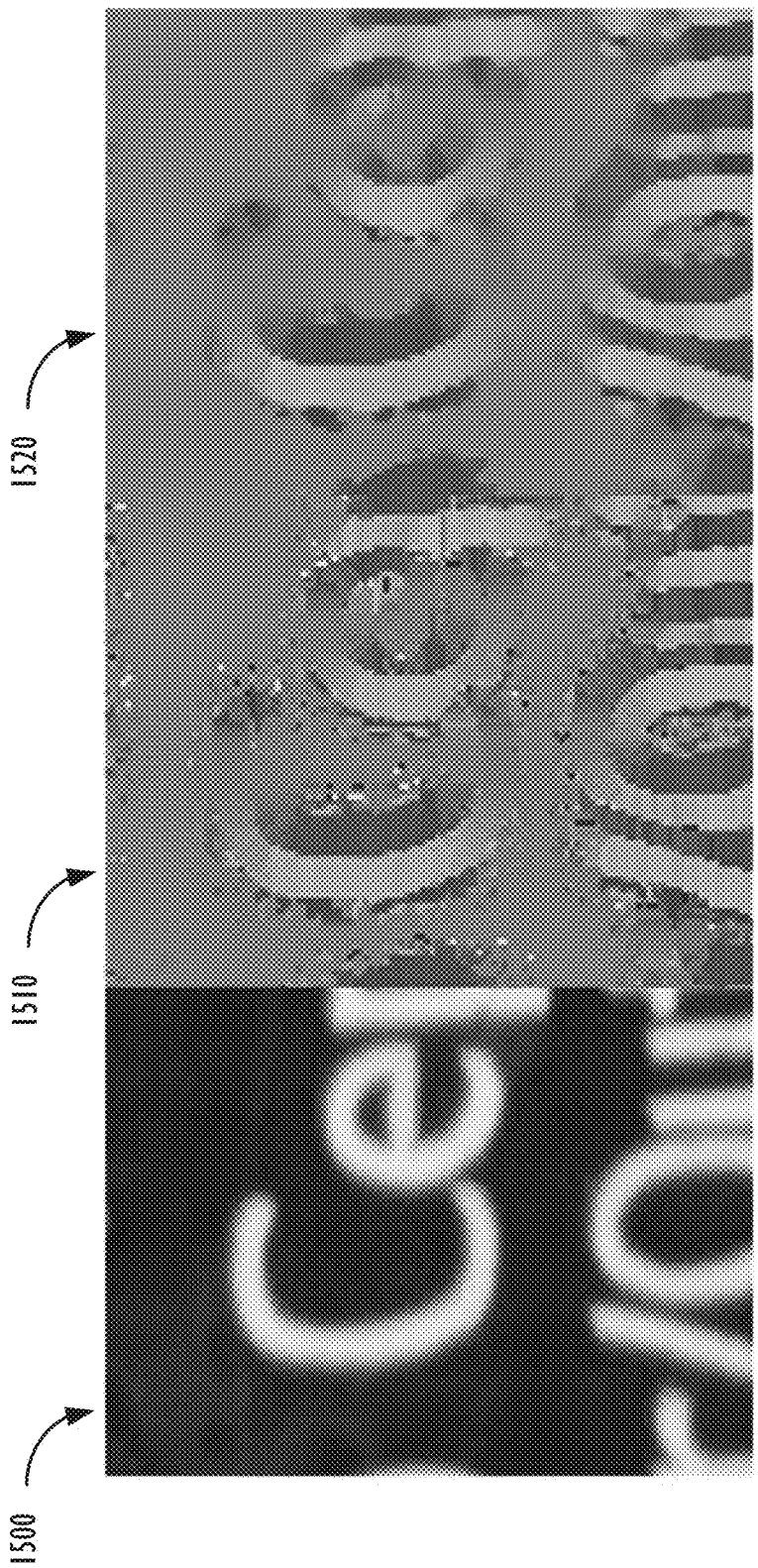

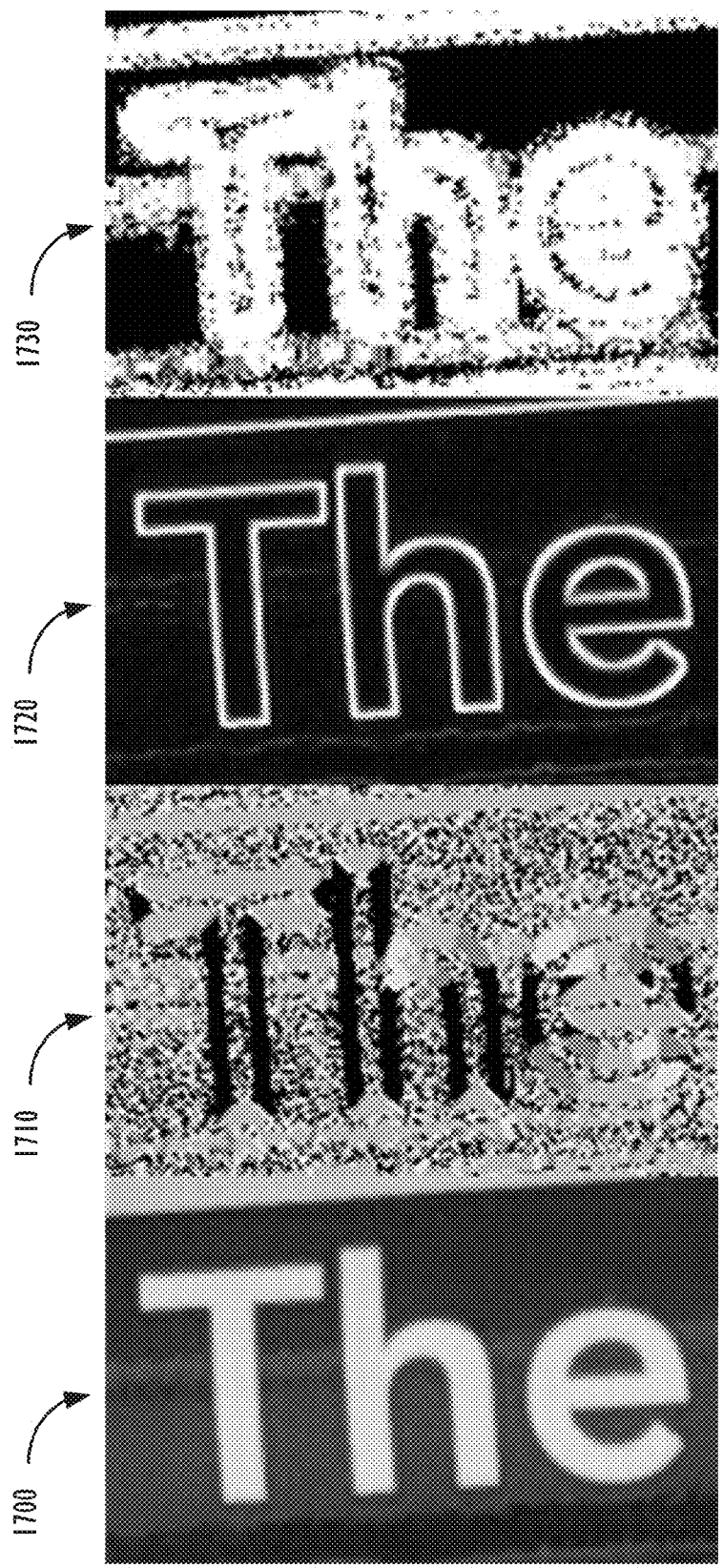

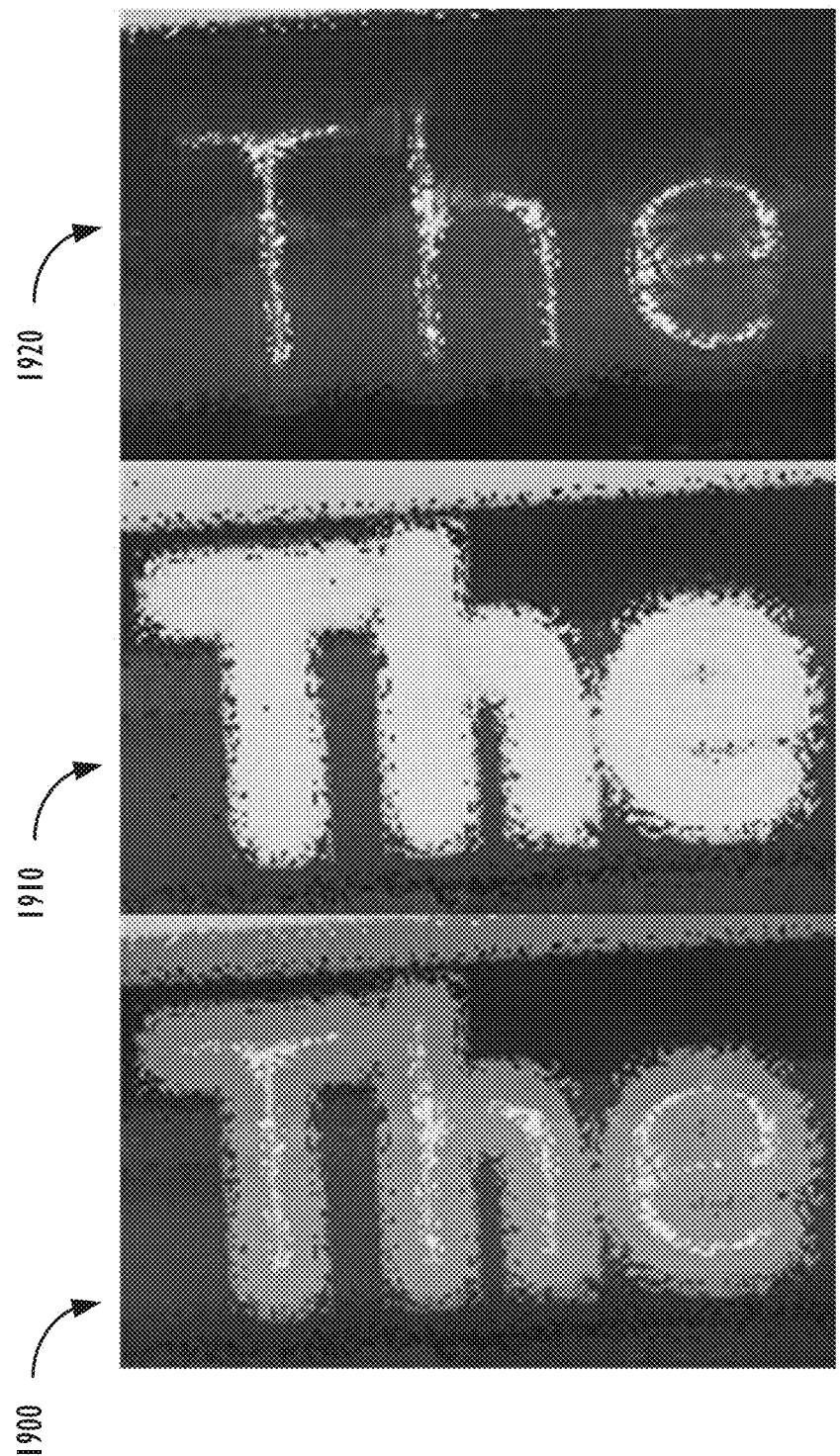

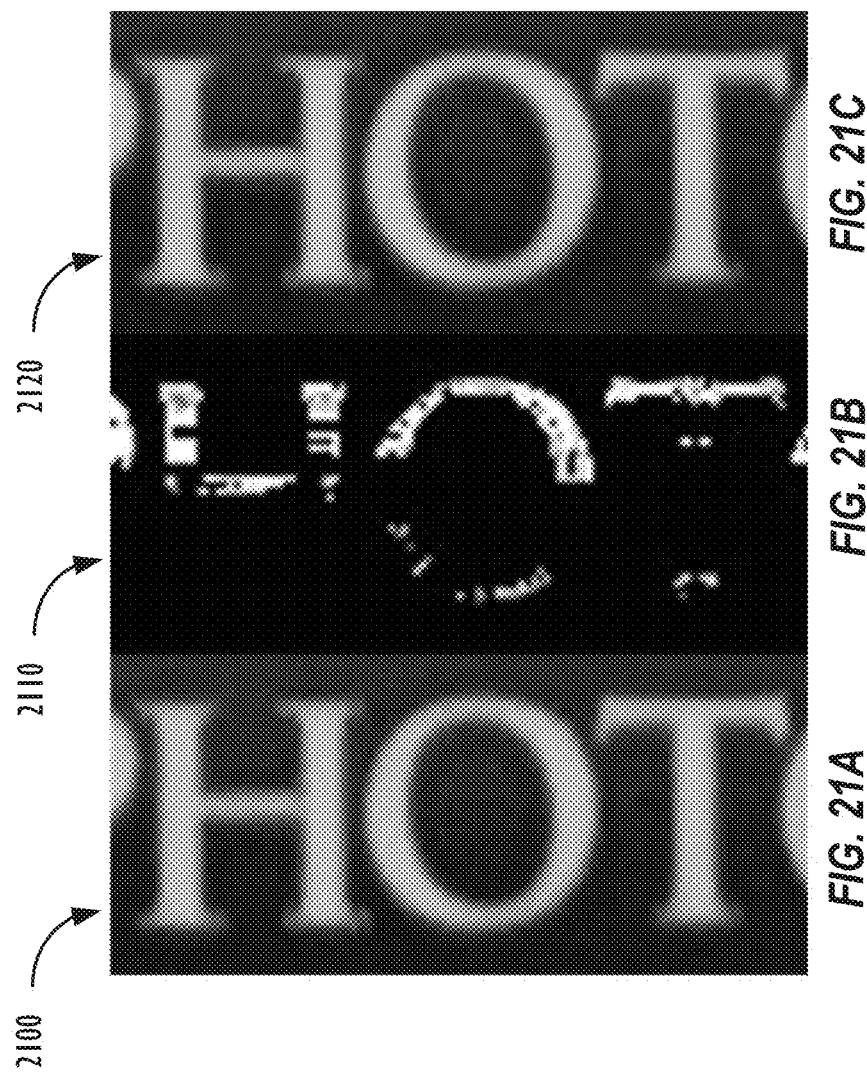

BLIND DEFRINGING FOR COLOR IMAGES

CROSS-REFERENCE TO RELATED APPLICATIONS

This application claims priority to provisional U.S. Patent Application Ser. No. 62/005,989, filed May 30, 2014 ("the '989 application"). The '989 application is hereby incorporated by reference in its entirety. This application is related to U.S. patent application Ser. No. 13/927,638, filed Jun. 26, 2013 ("the '638 application"). The '638 application is also hereby incorporated by reference in its entirety.

BACKGROUND

This disclosure relates generally to image processing techniques. More particularly, but not by way of limitation, it relates to novel techniques for performing "blind" image defringing.

In photography, different artifacts can affect the quality of the edges, i.e., the fringes, of objects in the image. This effect is more noticeable when the edge has high contrast. In repairing such a color "fringe" region, it is often effective to merely diminish the noticeability of the fringe. This can be done through chroma replacement with nearby values, desaturation, and by other means.

A color fringe is an artifact where an edge has a noticeable color in it that doesn't match the two colors on either side of the edge. In some images, this may be manifested in the form of a red-purple fringe on one side of a shape in the image and a blue-green fringe on the other side of the shape, for example.

Photographs have color fringes, usually at bright, high-contrast edges, for various reasons. The most common reasons are these: 1.) chromatic aberration of the lens system used to capture the photograph; 2.) light reflection within the micro lens system resident on the image sensor; and 3.) incorrect demosaicing of small (usually neutral) details in the image.

Usual approaches to color defringing involve chroma blur and chroma median filtering, which are operations that apply to the whole image. One motivation for improving upon these usual approaches is the understanding that, typically, not all pixels of an image display color fringing. Usually, fringing only occurs in high-contrast edges. Mere masking of the effects of the whole-image operations can improve the result, but further improvements are still possible.

SUMMARY

In one embodiment, a method to perform a so-called "blind" image defringing process is described. The blind defringing process described herein begins with blind color edge alignment. This process largely cancels every kind of fringe, except for axial chromatic aberration, for which displacements can be quite a bit larger than for other kinds of fringes. Next, the process looks at the edges and computes natural high and low colors to either side of the edge. The goal is to get colors that aren't contaminated by the fringe color. As used herein, "blind" refers to the fact that the image may be defringed without knowing what generated the fringe or specifically how the fringe is characterized. In general, though, the usual ways that fringing is generated are acknowledged and accounted for, in order to provide additional confidence that the blind defringing processes described herein are sufficient.

Next, the process resolves the pixel's estimated new color by interpolating between the low and high colors (which concepts will be described in greater detail below), based on the green variation across the edge and the amount of green in the pixel that is being repaired. Care is taken to prevent artifacts in areas that generally do not fringe, like red-black boundaries. The green channel is used because, in chromatic aberration, green represents the 'ground truth' of the edge position. This is also done because green has middle wavelengths.

Next, the process computes the final repaired color by using luminance-scaling of the new color estimate. This preserves the crispness of the edges. In some cases, the green channel may be scaled, creating the highest contrast edge attainable.

Finally, axial chromatic aberration may be corrected for, using a similar process that is careful to simply ignore the colors too close to very high-contrast high-brightness edges. This part of the process may be under a separate user-accessible control because it represents a somewhat extreme measure that most images may not need. Each step of this blind defringing process will be described in greater detail below.

The method may be embodied in program code and stored on a non-transitory storage medium. The stored program code may be executed by a processor that is part of, or controls, a device having a memory, a display, and a processor coupled to the memory, and the display.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 11A is a graph showing the RGB profile of an exemplary neutral edge.

FIG. 11B is a graph showing the RGB profile of an exemplary purple-fringed edge.

FIG. 11C is a graph showing the edge impulse functions of an exemplary blue-fringed edge.

FIG. 15A is an example of an input image for which a red-blue displacement map may be determined.

FIG. 15B is an example of the red-blue displacement map for the image of FIG. 15A.

FIG. 15C is an example of the median-filtered red-blue displacement map for the image of FIG. 15A.

FIG. 17A is an example of an input image for which a widened edge map may be determined.

FIG. 17B is an example of the direction map for the image of FIG. 17A.

FIG. 17C is an example of the edge map for the image of FIG. 17A.

FIG. 17D is an example of the widened edge map for the image of FIG. 17A.

FIG. 19A is an exemplary threshold value map for the exemplary image of FIG. 17A.

FIG. 19B is an exemplary high color average map for the exemplary image of FIG. 17A.

FIG. 19C is an exemplary low color average map for the exemplary image of FIG. 17A.

FIG. 21A is an exemplary image having 'notch-up' regions that is to be defringed.

FIG. 21B is an exemplary 'notch-up' region map for the exemplary image of FIG. 21A.

FIG. 21C is an exemplary defringed version of the exemplary image of FIG. 21A.

DETAILED DESCRIPTION

Figure 1:
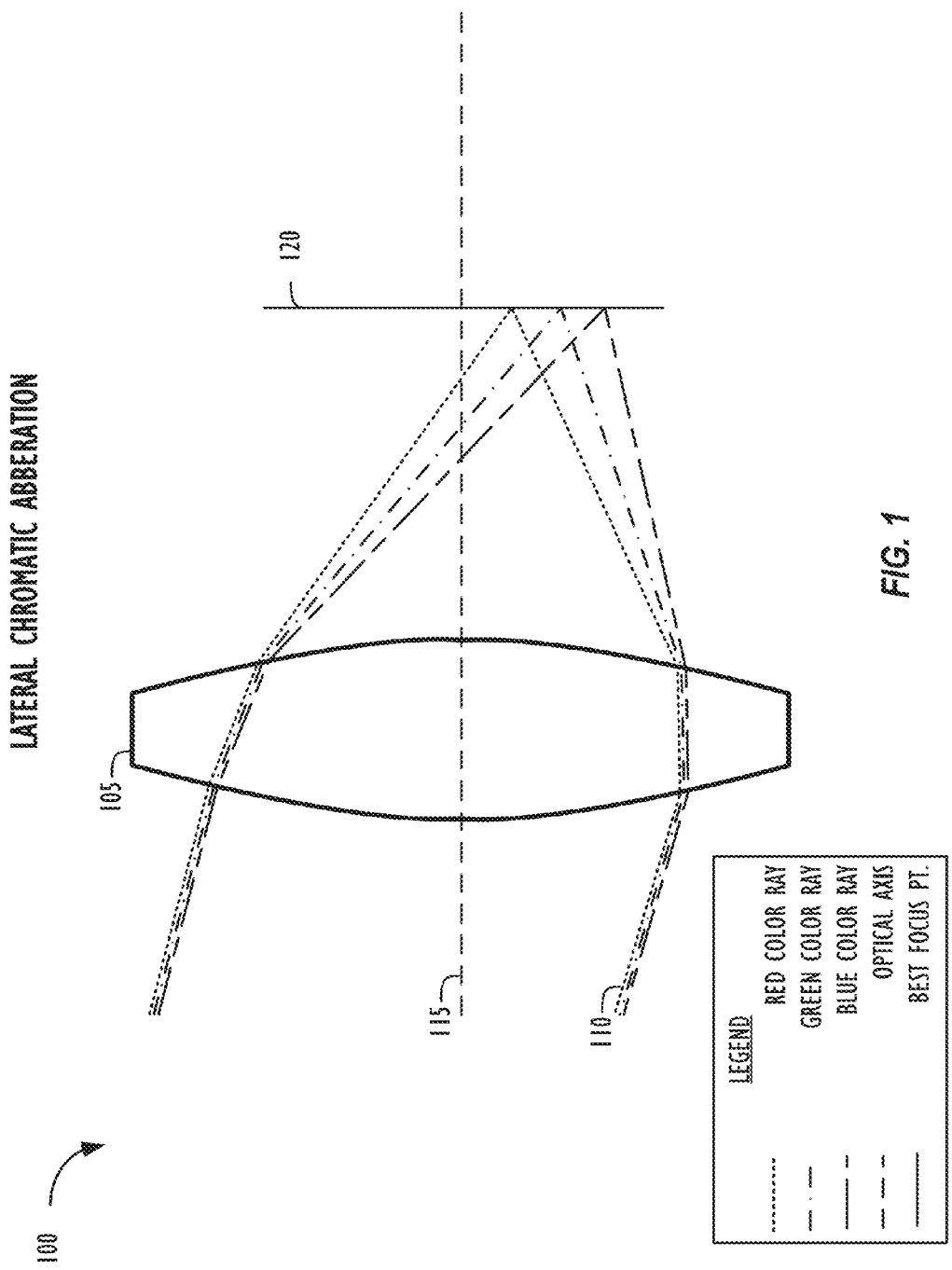
FIG. 1 is a diagram depicting an example of lateral chromatic aberration.

This disclosure pertains to systems, methods, and computer readable media for image processing. In general, techniques are disclosed for performing "blind" color defringing on image data.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of electronic device operations having the benefit of this disclosure.

Often, color fringing is confused with color noise. Color fringes are, in fact, distinct and come from completely different sources than color noises. More specifically, color fringe artifacts can come from various sources, but the primary causes are the various forms of chromatic aberration (CA). It is also possible for the demosaicing process to introduce color fringing. Color noise, on the other hand, arises from the random arrival time of photons to the image sensor, from the process of reading out the pixels from the image sensor, and from the imprecision in the manufacture of the image sensor. Chromatic aberration is usually split into two types: "lateral CA" and "axial CA," which will each be discussed in more detail below.

Lateral CA

In lateral chromatic aberration, properties of the lens system's index of refraction causes different wavelengths of light to bend at different angles, causing the red and blue channels to spatially diverge (usually radially out from the center of the image). It is possible to approximately cancel lateral CA by characterizing the lens and paying attention to the metadata concerning the lens settings. However, algorithms to cancel lateral CA are imperfect. Lateral chromatic aberration can be predicted and cancelled, with varying degrees of correctness and completeness. Usually, however, even in the best case, a one-pixel color fringe gets left behind—which results from a correctly shifted red or blue channel that merely has a slightly different point-spread-function (PSF) than that of the existing unmodified green channel.

Techniques used for canceling lateral CA will now be discussed in further detail. Normally, owing to the fact that most image sensors have a greater number of green photosites than either red or blue photosites, and owing to the fact that the green channel is the best approximating channel to the luminance of the color, the green channel from the image data represents the true position of the edges, and the red and blue channels are shifted so the red and blue edges more closely match the green edges. To accomplish these shifts, small vectors of distortion are evaluated for each pixel that give the shift of red and the shift of blue. Then, the red and blue data is interpolated to produce the red and blue color at the pixel. This interpolation introduces some softening in the red and blue channels. This softening can cause color fringing on high-contrast edges.

FIG. 1 shows an example of lateral chromatic aberration 100. Incoming light rays 110 enter convex lens 105, as shown in FIG. 1. The various red, green, and blue components of incoming light ray 110 are shown in the LEGEND of FIG. 1. As shown in FIG. 1, the best focus point 120 in this example of lateral CA occurs below the optical axis 115 of lens 105. At the best focus point 120, the red, green, and blue color rays have separated from each other, resulting in lateral CA. While lateral CA is most visible towards the edges and corners of an image, axial CA can occur in any area where there is an edge across which a large depth difference occurs. Almost all CA is only visible on high-contrast edges. With lateral CA, often one side of an object has a different color fringe from the other side. With Axial CA, the color of the fringe is dependent primarily upon the dark side of the edge and its relation to the plane of optimal focus.

Figure 2:
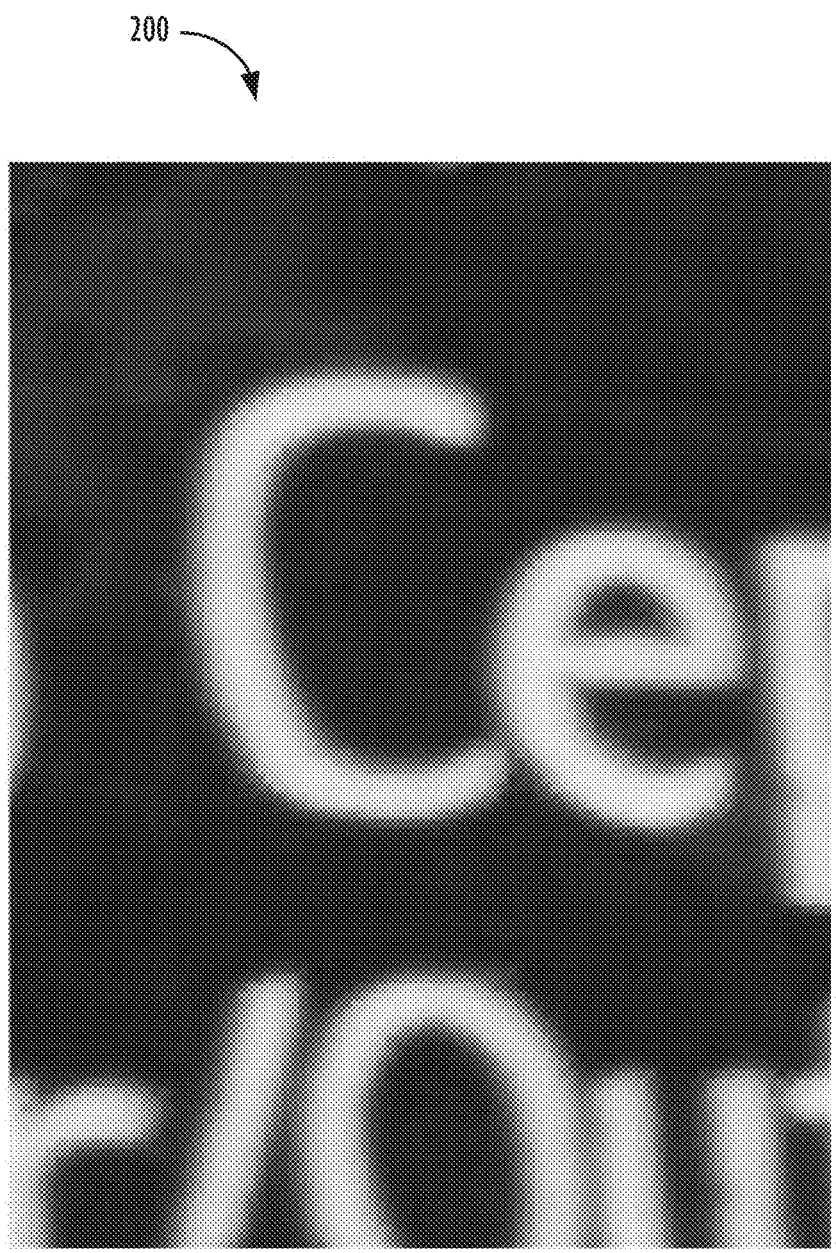
FIG. 2 is an example of an image before lateral CA has been corrected.

FIG. 2 is an example of lateral CA. FIG. 2 represents an image 200 with significant lateral CA. Exemplary areas of purple and green fringing are seen around the edges of the letters in FIG. 2.

Axial CA

In axial chromatic aberration, the same properties cause the red and blue channels to focus at slightly different focal lengths, resulting in a color fringe (usually a purple fringe). This kind of chromatic aberration cannot be predicted properly, and has to be cancelled using a less elegant algorithm. As mentioned, Axial CA may cause bright highlights to have purple or green fringes, depending upon on which side of the focal plane the object is in focus. This means an effective defringing process needs to be able to handle both cases. This problem cannot be geometrically cancelled like lateral CA because it depends upon the distance to the objects in the scene.

Figure 3:
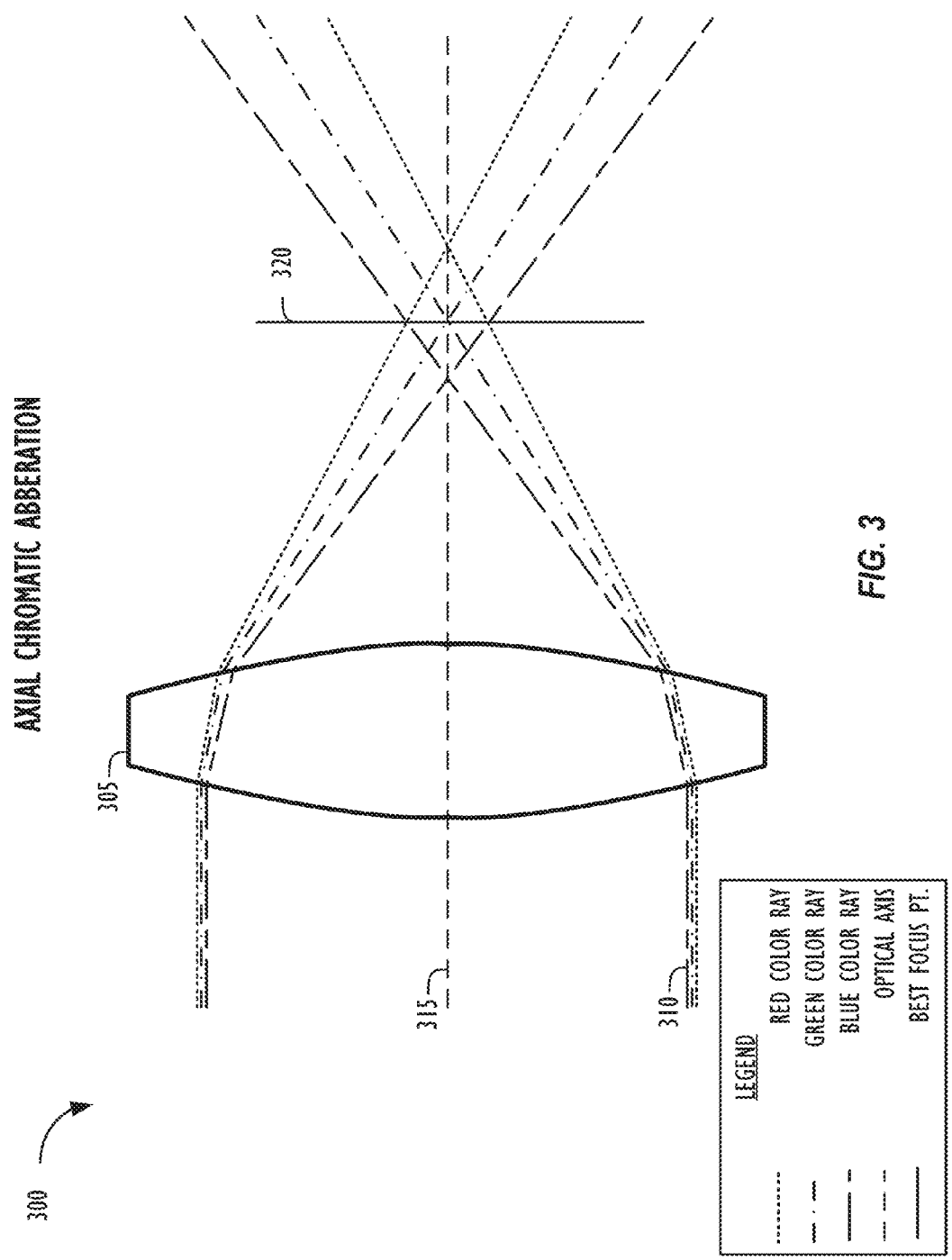
FIG. 3 is a diagram depicting an example of axial chromatic aberration.

As shown in FIG. 3, axial CA 300 occurs when different wavelengths of colors of incoming light rays 310 do not converge at the same point after passing through a lens 305 having optical axis 315. The various red, green, and blue components of incoming light ray 310 are shown in the LEGEND of FIG. 3. As shown in FIG. 3, the different colors of incoming light rays converge at different points along the plane positioned at the best focus point 320, resulting in axial CA.

Figure 4:
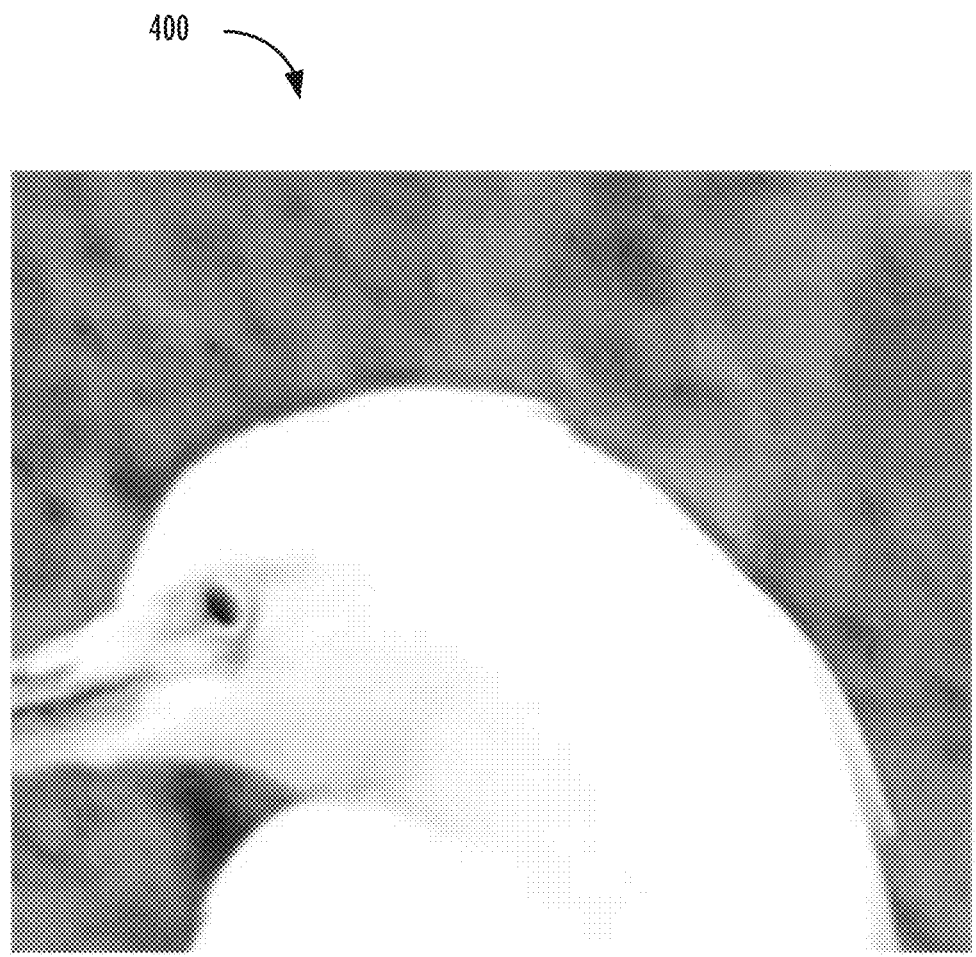
FIG. 4 is an example of an image before axial CA has been corrected.

FIG. 4 is an example of axial CA. FIG. 4 represents an image 400 after demosaicing with defringing to correct for the axial CA. Exemplary areas of purple fringing are shown around the edges of the bird in FIG. 4.

A 'standard' color defringing algorithm attempts to eliminate color fringing within an image, but may have very little information how to do so. This is called blind defringing. Such an algorithm directly recognizes fringes where it sees them and then attempts to eliminate them directly. Usual approaches to defringing are fairly simple. For example, a chroma blur may be used to soften edges of colors and diminish the effect of the fringe color. Alternately, a chroma median filter may be used to compress away small or thin chroma features.

A downside of these techniques is that they usually eliminate desirable color features, like crisp edges, or thin lines (such as might occur in signs and fabric) or even corners of color. These artifacts are particularly noticeable when the chromatic aberration channel displacements get large, because a much larger general filter radius is required to eliminate the fringes.

With lateral chromatic aberration, it is quite important to remove the color fringe before the reconstruction of the green channel (which usually occurs before, or at the same time as, the red and blue channel reconstructions in the demosaicing process). One reason for this is that, if the red and blue edges are displaced from the green edges, then reconstruction won't be quite as sharp. Also, and potentially more importantly, it's possible that some trace of the green channel's edge might be imparted into the red and blue channel edges—on top of the displaced red and blue channel edges. In other words, the edge displacement artifact can propagate as the image is reconstructed, making the artifact harder to remove later. For all these reasons, it is important to accomplish lateral chromatic aberration canceling early in the demosaicing process.

When lateral chromatic aberration is canceled early, there is still the problem that the red and blue channels are "softer" than the green channel. This fact is what can cause some color fringe. For example, in a standard Bayer pattern sensor, the Nyquist wavelength of the green channel is at sqrt(2) of the pixel pitch. The corresponding Nyquist wavelength of the red and blue channels is at twice the pixel pitch. And that's before the red and blue channels are interpolated in the lateral chromatic aberration canceling process, which can only increase the softness of those channels.

This problem is made even more difficult by other sensor patterns, such as the Fuji X-Trans pattern and the Fuji EXR CMOS pattern. This is because the PSFs for the red and blue channels can be even larger, or they may be irregularly shaped.

The Color Filter Array

As mentioned above, the demosaicing of the color filter array (CFA) is a source of fringing artifacts in and of itself. In a standard Bayer CFA, red and blue both have a base wavelength that is larger than the base wavelength of green by a factor of the square root of 2 (i.e., ~1.41×). This means that most interpolation artifacts (i.e., from determining the missing pixels) will be larger by that same factor. This is most noticeable in bright lights. In another common CFA, the Fuji X-trans CFA, both the red and blue channels have a base wavelength that is approximately twice that of the base wavelength of green, making the problem even worse than with a Bayer CFA.

Figure 5B:
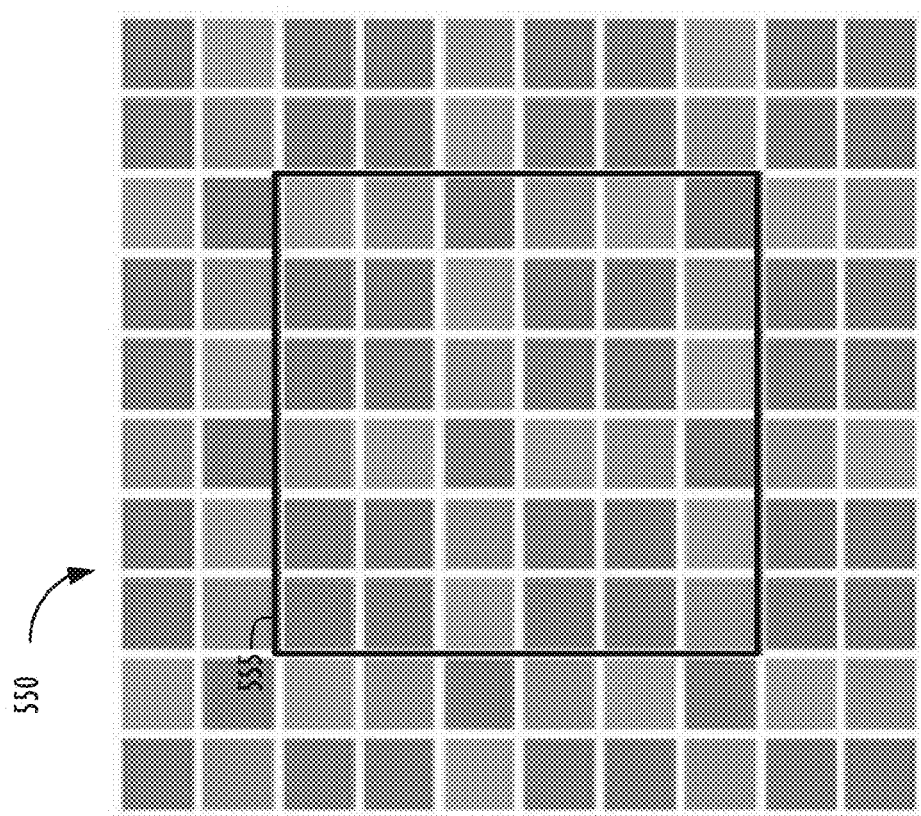
FIG. 5B illustrates an exemplary Fuji X-trans CFA.
Figure 5A:
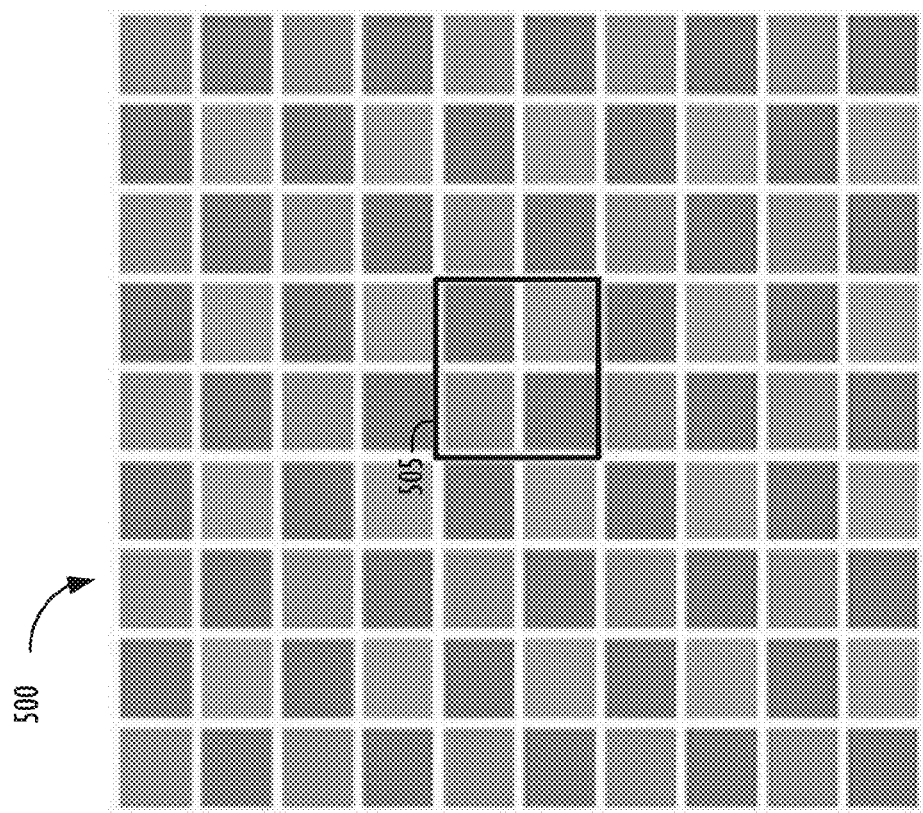
FIG. 5A illustrates an exemplary Bayer CFA.

FIG. 5A shows a diagram representative the Bayer CFA 500, and FIG. 5B shows a diagram representative of the Fuji X-trans CFA 550. In the Bayer CFA 500, the repeated block is surrounded by a square 505, while in Fuji X-trans CFA 550, the repeated block is surrounded by a square 555.

When interpolating the red and blue channels from the Fuji X-trans CFA, the positions of the red and blue pixels are less regular and are spread farther apart, so the interpolation is considerably softer. Alternatively, the green pixels are more numerous and, in general, closer together, thus making the green interpolation much sharper than with the Bayer CFA.

These conditions all combine to create a different pixel spread function (PSF) for the green pixels than for the red and blue pixels. To minimize the fringe from lateral chromatic aberration, it is important to take care in interpolating the relatively 'sparse' red and blue channels. This can be done by creating early reconstructions of the red and blue channels using local feature directions as an interpolation guide to limiting PSF increase from interpolation. For various reasons, what is needed is a method of removing the lateral chromatic aberration that can accomplish its task without a lot of external help or measurement. This process is referred to herein as "blind color edge alignment."

Figure 6:
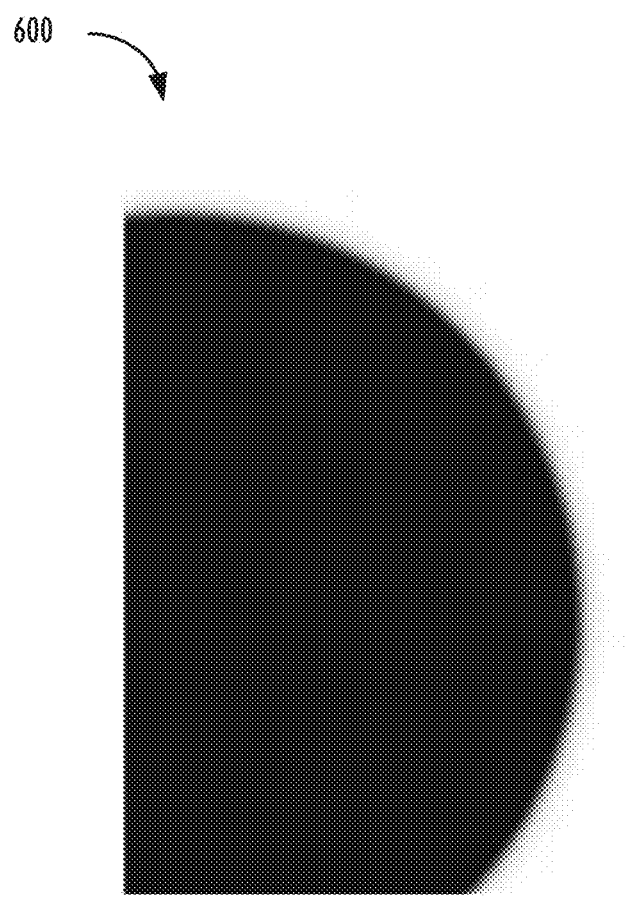
FIG. 6 is an example of an object with different pixel spread functions (PSFs) for the red, green, and blue channels.

FIG. 6 shows the edge of a black object 600 with different PSFs for red, green, and blue.

Defringing Algorithm

The description of the defringing algorithm that follows is but one exemplary embodiment of a process for performing blind color defringing on image data and is presented for illustrative purposes. The full scope of the invention herein is limited only by the language of the claims.

The blind defringing algorithm, in accordance with the exemplary embodiment being described herein, operates on a fully demosaiced linear RGB image. The blind defringing process described herein is intended to operate on image data that has already been white-balanced. The process begins by examining a small neighborhood of pixels around the pixel currently being processed. For example, the reach can be as much as nine pixels in any direction.

This defringing algorithm can be easily rewritten for a color image that is not linear (for instance, gamma-corrected). In this case, the steps of each component are more perceptually-spaced. In this case, it is usual to replace the ratios between color components with differences (for instance, r/g is replaced with r−g, so desaturating by interpolating towards 1 is replaced with desaturating by interpolating towards 0, and so forth, as will be described in further detail below).

1. Blind Color Edge Alignment

A new method for aligning color edges will be described herein that can accomplish its goal without a description of the misalignment.

Most algorithms for lateral chromatic aberration correction operate based on a characterization of the setting of the lens system, and involve piecewise formulas for the displacement of red and blue channels with respect to the green channel. The use of formulas works fairly well if the formulas are correct.

While it is possible to predict the spatial function that determines the edge displacement of the red, green, and blue channels, the process of prediction is nonetheless an imperfect process. A number of conditions can lead to incorrect formulas, many of which are not under the control of the ones that characterize the camera lens system.

For instance, it's possible to characterize one lens system only to realize that glass material quality, glass grinding quality, material differences due to multiple vendors, and variable glass alignment and spacing within the lens system can cause the characterization to become effectively useless when attempting to cancel lateral chromatic aberration from an "identical" lens.

It's also possible that, when demosaicing, the algorithm simply does not know the lens type or the focal length used, because the metadata is not available. Or, it can happen that the algorithm is required to cancel lateral chromatic aberration on a file that has already been demosaiced, such as a JPEG file.

In these cases, it is advantageous to have a "blind" method for aligning color edges within an image. This can also conveniently help in removing fringes that are a result of a demosaicing process. Color edge alignment is not a perfect solution to the defringing problem. The point-spread-functions for each channel can differ. This is particularly so after interpolation, which is generally required for alignment of any kind.

Figure 7B:
FIG. 7B is an example of the results of approximate edge alignment being applied to the image of FIG. 7A.
Figure 7A:
FIG. 7A is an example of an image exhibiting significant lateral CA.

Turning now to FIGS. 7A and 7B, an image 700 exhibiting significant lateral CA is shown in FIG. 7A, while the results of approximate edge alignment being applied to image 700 are shown in image 750 of FIG. 7B. The blind edge alignment process will now be discussed in further detail.

The most noticeable part of a color fringe (that is a result of lateral chromatic aberration) is often that the red and/or blue channel separates from the green channel at an edge. The separation is visible because the actual vector of the displacement of the red or blue channel has some non-zero component perpendicular to the edge direction.

Figure 8B:
FIG. 8B is an example of the direction vector map for the image of FIG. 8A.
Figure 8A:
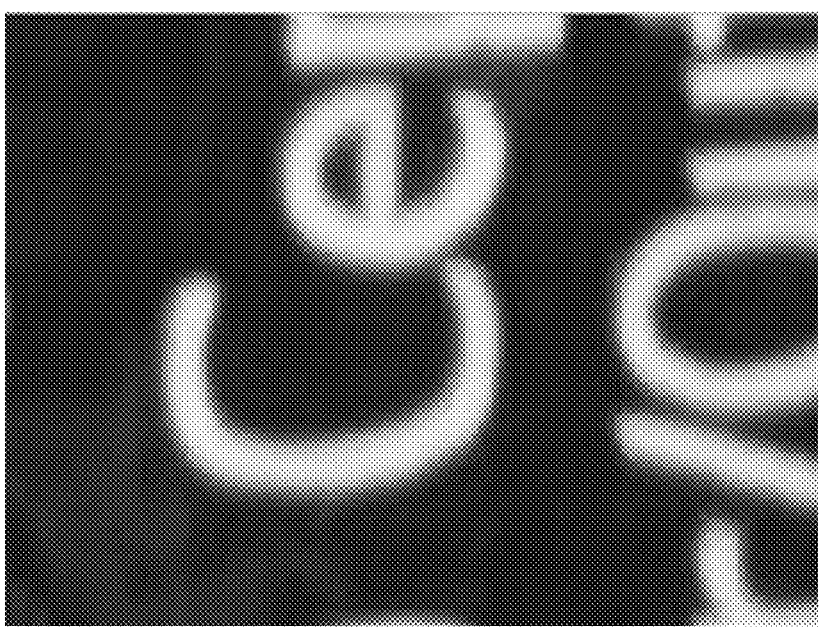
FIG. 8A is an example of an input image for which a direction vector map may be determined.

A direction map gives us a direction for each pixel that enables us to determine the perpendicular search direction near an edge. For simplicity, the direction vectors are quantized to the set $\{(1,0), (1,1), (0,1), (-1,1), (-1,0), (-1,-1), (0,-1), \text{and } (1,-1)\}$. For input image 800 shown in FIG. 8A, each unique direction vector is shown in its own color in image 850 shown in FIG. 8B.

According to some embodiments, the direction map is computed using a jet of Gabor filters. Directions in an image are actually a vector field. The directions in this field may be evaluated by convolving a Gabor filter for each discrete direction at the pixel to compute a magnitude for that direction. If each Gabor direction magnitude is multiplied by its corresponding direction vector, then the vector results may be summed for all discrete directions to compute an accurate direction vector. The length of this vector is the Gabor magnitude. The vector can then be normalized and quantized to generate one of the eight vectors in the above set. It may now be seen that this can be done using only two convolutions, one for x and one for y, which speeds up both direction finding and Gabor magnitude computation.

Figure 9:
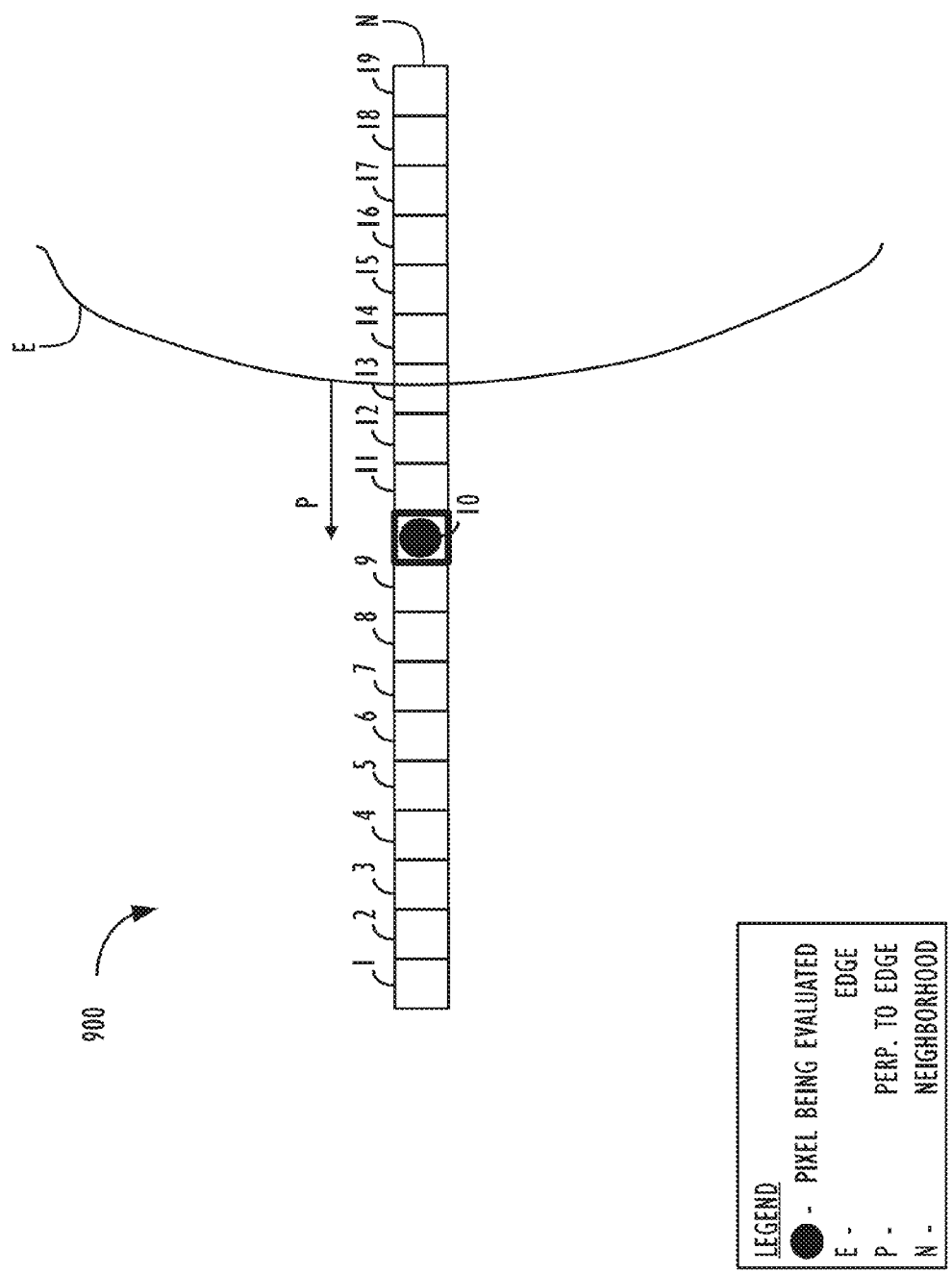
FIG. 9 illustrates an exemplary pixel neighborhood extending perpendicular to the quantized edge direction of an exemplary image edge, in accordance with one embodiment.

As shown in FIG. 9, an image 900 comprises a neighborhood (N) of some number of pixels, e.g., nineteen pixels, with nine on either side of a pixel that is being evaluated. As shown in FIG. 9, the neighborhood (N) of pixels extends in a direction that is perpendicular (P) to the quantized edge direction (E) within the image. If the pixels and the Gabor magnitudes are sampled (across the edge, but centered on the pixel) in a direction that is perpendicular to the quantized edge direction, a sample set of pixels (i.e., the neighborhood) and Gabor magnitudes may be produced that cross the edge. The direction at the pixel and the availability of a sample set of pixels perpendicular to the direction of the edge allows the algorithm to simplify the determination of the displacement of red or blue to a one-dimensional problem near any edge.

Figure 10:
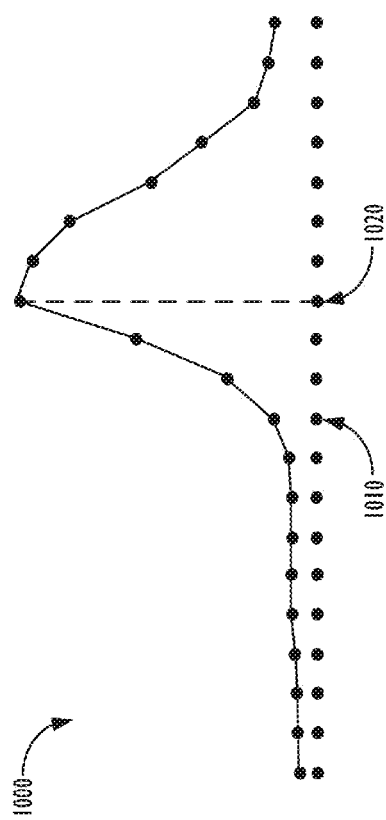
FIG. 10 is a dot plot illustrating the green channel edge impulse function at each pixel across the exemplary image edge, in accordance with one embodiment.

As is shown in plot 1000 of FIG. 10, an analysis of the pixels 1010 in the sample set may be undertaken in order to identify the RGB profile of the edge 1020. In this case, the Gabor magnitudes of the green channel are used to produce the edge impulse function shown. However, and potentially more importantly, by analyzing the Gabor magnitudes of red, green, and blue in the sample set, the edge itself may be visualized.

Turning now to FIGS. 11A and 11B, the RGB profiles of a neutral edge (edge 1100 of FIG. 11A) with no color channels showing significant displacement, and a purple-fringed edge (edge 1110 of FIG. 11B) with red and blue channels showing significant displacement are shown. When the three (RGB) channels in the sample set's pixels are graphed, the separation of the color channels becomes more apparent. When the Gabor magnitudes in the sample set are analyzed, the positions of the color edges may be visualized more easily.

Turning now to FIG. 11C, the edge impulse functions 1120 across a blue-fringed edge derived from Gabor magnitudes are shown. Using these edge impulse functions, interpolative peak-finding techniques may be used to evaluate the displacements of the red and blue channels from green. If the peaks of the red, green, and blue components are found independently, subtracting the sub-pixel positions of the peaks determines the displacement. According to some embodiments, non-interpolative techniques, such as simply using the integer pixel position of the peak, are not accurate enough for the algorithm's edge-alignment requirements.

Figure 12B:
FIG. 12B is an example of the edge impulse map for the image of FIG. 12A.
Figure 12A:
FIG. 12A is an example of an input image for which an edge impulse map may be determined.

FIGS. 12A and 12B show and example of an image 1200 and its edge impulse map 1250, respectively. The edge impulse map shown in image 1250 was computed using component-wise Gabor magnitudes.

Peak Finding within the Edge Impulse Signal

Figure 13A:
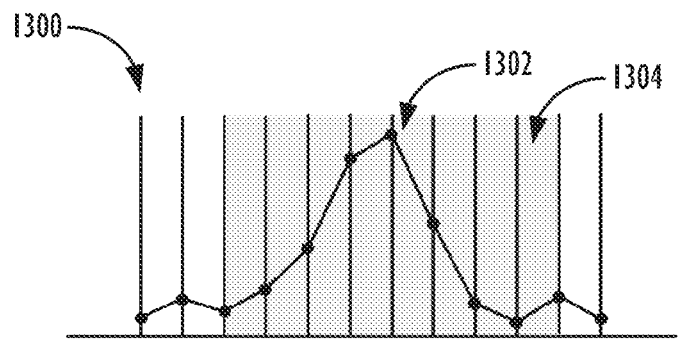
FIG. 13A is an exemplary red, green, or blue profile of an exemplary image edge showing a maximum permitted search window.

A Lagrange peak-finder is a more accurate method of finding a peak within an edge impulse signal. First, a maximum (peak) sample is found. Then a parabola is fit to the peak sample and the samples to left and to right of the peak. Then, the zero of the derivative of this parabola is found to get the sub-pixel position of the peak. FIG. 13A shows an exemplary signal 1300, its peak sample 1302, and a maximum permitted search window 1304.

The most accurate method, producing a good sub-pixel peak position, is the integrated centroid peak-finder. In this embodiment, the signal is found by sectioning the image in a direction perpendicular to the edge, and the signal is actually a measure of gradient magnitude at those pixels. The first step is to locate the local maximum (peak) of the signal closest to the pixel. This corresponds to the pixel at the steepest gradient of the edge. Next, a maximum permitted search window 1304 is established by limiting the number of neighboring pixels to be examined. In FIG. 13A, four pixels to either side of the peak are searched. However, sometimes this can end up searching too far because there might be a nearby feature causing an edge. If the window is not sufficiently limited, that edge might be found in the red or blue channel, and this can cause the fringing to actually be introduced because a false assumption is made that the green peak of one edge is associated with the red or blue peak of another edge.

Figure 13B:
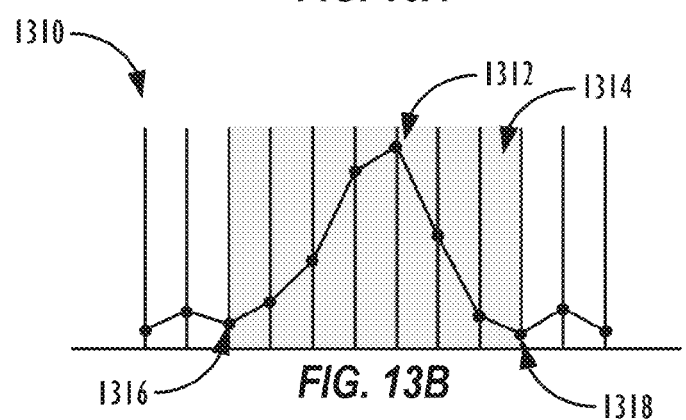
FIG. 13B is an exemplary red, green, or blue profile of an exemplary image edge showing a maximum permitted search window and local minima.

Thus, the second step, as shown in FIG. 13B, is to search out along the signal 1310 from the peak 1312, within the maximum permitted search window 1314, and find valleys (i.e., local minima) 1316/1318 in the signal. If necessary, the search window may be 'trimmed' to stop at the neighboring valleys. This reduces a false indication from any neighboring feature, or possibly the opposite edge of the same object. After the completion of this second step, there is a valid signal window to integrate over.

Figure 13C:
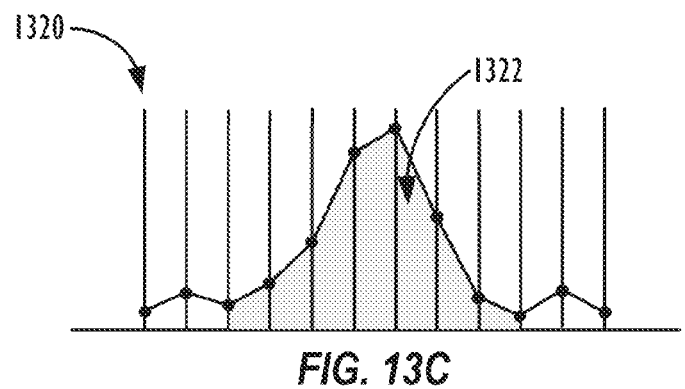
FIG. 13C is an exemplary red, green, or blue profile of an exemplary image edge showing an integrated region.
Figure 13D:
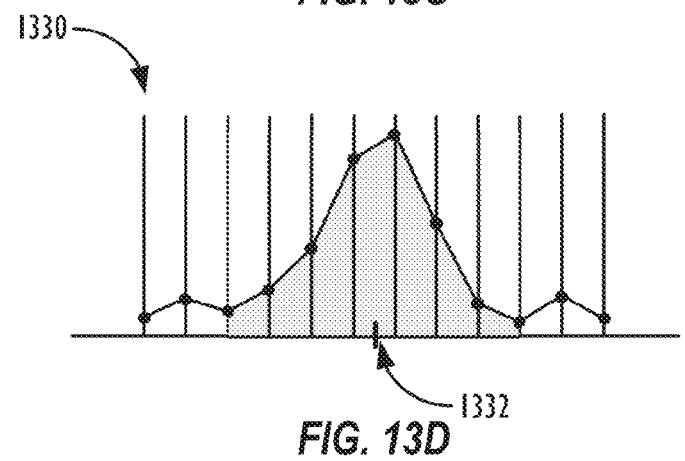
FIG. 13D is an exemplary red, green, or blue profile of an exemplary image edge showing an integrated region and a centroid position.

The third step, as shown in FIG. 13C, is to integrate the region 1322 under the signal 1320 within the search window. The goal in this process is really to compute a centroid point, i.e., the x position within the integrated region that 'balances' the signal. To accomplish this step, the signal values may be used as weights. First, the process may determine the sum of the weights within the integrated region. Next, the process may determine the sum of the products of the weights and their corresponding x locations. Finally, the process may divide the sum of products by the sum of the weights to produce the centroid x position, as is shown by centroid 1332 of signal 1330 in FIG. 13D.

This is now a sub-pixel accurate peak value. Recall that, by 'x position,' what is really meant is the position within the sample set of pixels gathered along the line approximately perpendicular to the nearby edge. This line passes directly through, and the set may be centered on, the pixel that is being examined. In general, the integrated centroid peak-finding method is sufficient and results in a good prediction of the color edge location.

Evaluating Displacements

According to some embodiments, the convention is followed that the green channel is correctly positioned and that the red and blue channels are actually displaced from it. So, to compute red and blue displacements from the green channel, matching peaks must be found on all three color channels. First, the algorithm looks at the green signal, sampled along a line approximately perpendicular to the edge near the pixels being examined. A fixed number of pixels are then sampled along this line. For example, nineteen pixels may conveniently be sampled by sampling the pixel itself and nine pixels to either side of the pixel along the line, as was discussed above with reference to FIG. 9. Each pixel has a red, green, and blue component. These are treated as separate signals for the purposes of peak-finding. Then, a peak is located on the green sample set. The nearest maximum in the green signal to the point being examined is found. It is then allowed to 'snap' close to the pixel being examined by finding local maxima and then finding the local maximum with the maximum value of the peak signal value divided by one plus the distance from the pixel.

Starting with the appropriate peak in the green channel, the integrated centroid peak-finding technique may be used to compute a sub-pixel accurate green signal peak. Next, the red and blue peaks may be computed. To do this, first find the local maximum within the red signal that is closest in location to the green peak. Then, use the integrated centroid peak-finding technique to compute a sub-pixel accurate red signal peak. This process is then repeated with the blue signal. Once sub-pixel accurate red, green, and blue peaks have been computed in their edge impulse signals perpendicular to the edge, the red peak location may be subtracted from the green peak location to compute the displacement of red from green along the same line. This process may then be repeated to compute blue displacement.

Figure 14:
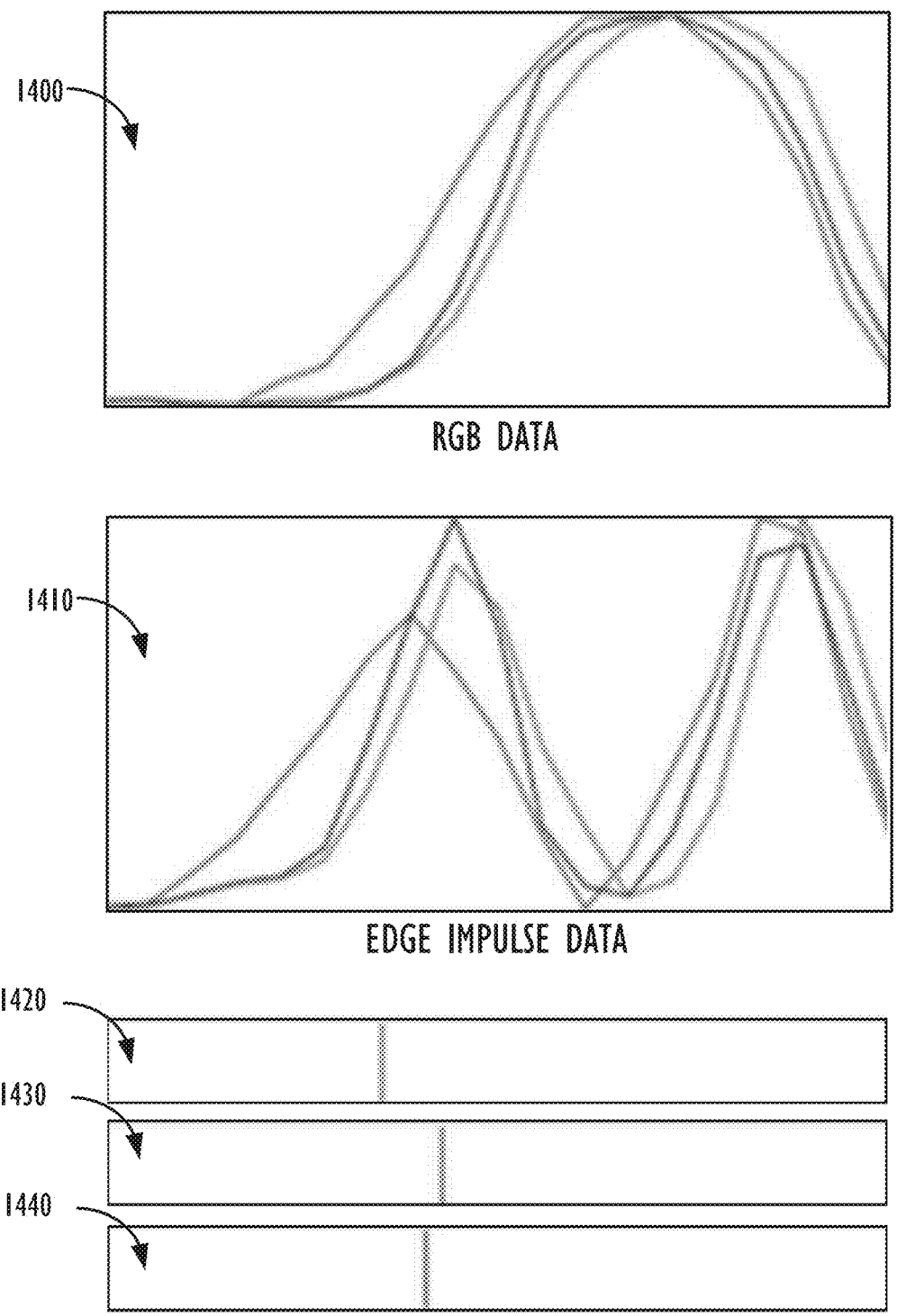
FIG. 14 illustrates exemplary RGB signal data across an edge, the corresponding edge impulse data, and the corresponding RGB peak locations.

Turning now to FIG. 14, exemplary RGB signal data 1400 across a (relatively thin) edge, the corresponding edge impulse data 1410, and the corresponding RGB peak locations (1420=red; 1430=green; 1440=blue) are shown for a hypothetical edge occurring in an image.

Once displacement values are known, it may still be useful to set the displacements to zero when the edge impulse values are well below a given threshold. This is indicated by the flat gray areas in the displacement map 1510 shown in FIG. 15B, which represents the red and blue displacements of the edges in image 1500 of FIG. 15A. There may be quite a bit of noise in this displacement map, particularly in the flat areas of the image. Thus, according to some embodiments a 3×3 median filter may be applied to the red-blue displacement map, as is shown in median-filtered red-blue displacement map 1520 of FIG. 15C.

Displacing the Pixels

The final step of blind color edge alignment is to actually move the red and blue channels, along the directions determined at each pixel by the corresponding direction in the direction map, by an amount determined by the displacement map. For each pixel of the image, the direction vector may be looked up from the direction map and the red and blue displacements may be looked up from the (filtered) displacement map. The green value of the resultant edge-aligned pixel is simply taken from the original image's green channel.

Figure 16B:
FIG. 16B is an example of the edge-aligned result image for the image of FIG. 16A.
Figure 16A:
FIG. 16A is an example of an input image for which an edge-aligned result image may be determined.

The red displacement may then be multiplied by the direction vector to compute the actual displacement of a new pixel from the current pixel's position. The new pixel may be looked up using interpolation because it is very likely to be in-between four pixels. Once this pixel is looked up, its red channel may be used for the red channel of the result. This process may then be repeated by multiplying the blue displacement by the direction vector and using the resultant displacement vector to look up the pixel which is used for the blue channel of the result. While this method does indeed align the red, blue, and green edges well, it is worth noting that the point spread function (PSF) of each channel is likely to be different, and that this fact usually means that the edges in the edge-aligned image result will still have a bit of color fringe. Though, as shown in exemplary 'before' image 1600 of FIG. 16A and exemplary 'after' image 1650 of FIG. 16B, the color fringes are apparently greatly reduced.

2. Determining Natural Edge Colors

The next part of the blind defringing algorithm involves a novel, efficient technique that is used to extract the natural high and low colors on either side of an edge within an image. This defringing algorithm differs from others because it is highly efficient, it works hard to keep features crisp, and it retains the original colors. The best result of a defringer is a photograph where the objects maintain their color all the way to their edges, and the objects they are in front of have the same qualities. This method works almost all of the time, but there are several cases this method doesn't work, such as the 'notch' cases, where generally only desaturation of the notch color will work, as will be described in greater detail below.

Getting Directions and Edges

To work properly, this algorithm needs a direction map and an edge map. These can be computed in various ways, and won't be discussed here. Exemplary details regarding the computation of direction maps and edge maps may be found in the '638 application incorporated by reference. However, according to some embodiments, the edge map should have a small amount of thickness to it to start with. For exemplary image 1700 shown in FIG. 17A, the direction map implements four directions. As shown in exemplary direction map 1710 in FIG. 17B: black is horizontal, dark gray is 45-degrees ascending, medium gray is vertical, and light gray is 45-degree descending. The directions in flat color areas are random. The edge map 1720 shown in FIG. 17C has an initial thickness of between 1.5 and 2.5 pixels, and has some anti-aliasing. It is also computed to be a chromatic edge. If there is a large red delta between the two sides of the edge, then the edge will appear red in the edge map.

Thus, it is advantageous to thicken the edge map also by several pixels, as is shown in exemplary widened edge map 1730 in FIG. 17D. Thickening the edge map is advantageous because the edge mask must include all the pixels of the color fringe, which can be quite thick. The edge map may be thickened by using the direction map to load edge map pixels across the edge. The component-wise maximum value of the edge map pixels that cross the edge may be calculated. Then, the sum of the median and minimum components of the maximum edge value may be calculated. The reason for doing this is that, it has been determined by the inventor that at least two color components are normally needed to be high in order to show a color fringe. When they separate from each other, this produces a noticeable fringe. So, if one color component dominates, another color component is required to produce a fringe.

For example, consider a black area with red letters inside it. This case cannot produce a color fringe at all because only one color component is used. However, a black area with yellow letters has both red and green (present in the yellow letters), so a color fringe on the edge of the letters can easily occur when red separates from green.

Loading a Sufficiently Variable Neighborhood of Colors

Many defringing algorithms load a large area of pixels to access local color information in order to make a more informed decision of how to defringe. The blind defringing algorithms disclosed herein load far fewer pixels than the typical methods to achieve a given reach on each side of an edge in the image. While the defringing algorithms disclosed herein may vary their reach, some embodiments may use a reach of 7 pixels.

For example, if the algorithm required a reach of 7 pixels, a typical method would read a radius 7 circle of pixels, or about 150 pixels. In contrast, the algorithms described herein saves time by only reading a thin slice of pixels that cross the line. This would mean that, at each center pixel, the algorithm would load 15 pixels from a line centered on the pixel and perpendicular to the local direction. This set of pixels is then examined.

In this set of pixels, pixel s1 is on one side of the set (e.g., the left side), pixel s15 is on the other side of the set (e.g., the right side), and pixel s8 represents the center pixel. The position of these pixels with respect to the edge depends upon the position of the center pixel (s8) with respect to the edge. For example, if s8 is on the edge, then s1 will be on one side of the edge and s15 will be on the other side of the edge. So, for a reach of n pixels, the algorithm would need to examine a set of 2*n+1 pixels.

Computing the Green Range and Evaluating a Threshold

Over the set of 15 pixels (or 2*n+1 pixels, depending on implementation), a minimum and a maximum green component value is determined, called lo and hi. Then, a green threshold is computed in the following manner:

$$thresh=pow(lo*hi*hi,0.33333);$$

This threshold is closer to the high green than the low green.

Computing High-Side Bits for all 15 Pixels

Figure 18:
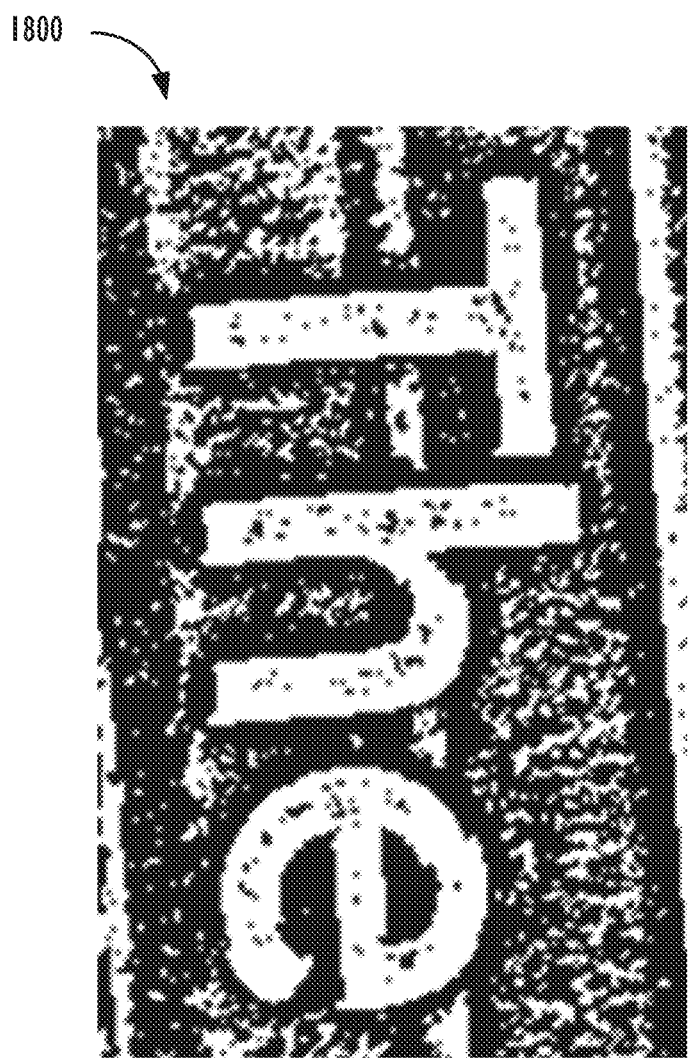
FIG. 18 is an exemplary high-side bit map for the exemplary image of FIG. 17A.

For each of the 15 pixels (or 2*n+1 pixels, depending on implementation), a 'high-side bit' is computed, which will be referred to herein as: h1, h2, . . . , and h15, etc. One of these values has a value of 1 if the corresponding pixel has a green component value greater than or equal to the threshold. A value is then 0 if the corresponding pixel has a green component value less than the threshold. Image 1800 in FIG. 18 shows what the high-side bit looks like for the center pixel s8 in exemplary image 1700. The other pixels' high-side bits are not shown for convenience and clarity's sake. High-side bit map 1800 may be conceptually thought of as a massively contrast-normalized image.

Computing Low and High Color Averages

Next, the algorithm may examine the 15 pixels (or 2*n+1 pixels, depending on implementation) and use the high-side bits to evaluate the average high and low colors. First, the algorithm may set the high and low color sums to zero. The algorithm may also set the high count and low count to zero. Next, for all 15 pixels, the algorithm may examine the high-side bit. If this bit is set, then the pixel gets added into the high color sums and the high count is incremented. Otherwise, the pixel gets added to the low color sums and the low count is incremented. Finally, the algorithm may divide the high color sums by the high count to get the high color average. The algorithm may also divide the low color sums by the low count to compute the low color average. As may now be more fully appreciated, the high color average and the low color average approximate the colors on either side of the edge. Image 1900 of FIG. 19A represents an exemplary threshold value map, while image 1910 of FIG. 19B represents the high color average of the exemplary image, and image 1920 of FIG. 19C represents the low color average of the exemplary image.

According to some embodiments of the algorithm, one more step is added to the summing and averaging procedure. For the colors close to the edge, the algorithm may reduce their weights. On the high side, the nearest and the next nearest pixels to the edge may be weighted as ⅓ and ⅔, respectively. On the low side, the nearest 4 pixels to the edge (in order of nearest to furthest from the edge) may be weighted ⅕, ⅖, ⅗, and ⅘, respectively.

For a high side pixel, the algorithm may look at the 3 high-side bits before and the 3 high-side bits after the pixel (which has a high-side bit already known to be 1). The sum of the three high-side bits before the pixel may then be multiplied by the sum of the three high-side bits after the pixel, and that product may be divided by 9 to create the weight for the pixel.

For a low side pixel, the algorithm may look at the 5 high-side bits before and the 5 high-side bits after the pixel (which has a high-side bit already known to be 0). Five minus the sum of the five high-side bits before the pixel is multiplied by five minus the sum of the five high-side bits after the pixel and that product is divided by 25 to create the weight for the pixel. This method works best when the dividing line between high and low colors is even. However, it also works well for other cases, even though it depends merely upon the count of nearby high-side bits.

3. Resolving the Defringed Color

The next part of the blind defringing algorithm involves resolving the defringed color by looking at the position of the center pixel with respect to the edge, and identifying cases that can't be handled with simple interpolation.

Computing the Initial Estimate of the Defringed Color

Pixel s8 has a green value that indicates the phase of the center pixel within the edge. Using the hi and lo green values already computed, the process merely needs to look at the relation of pixel s8's green component with respect to these:

phase=(s8.g−lo)/(hi−lo);

estimate.r=lowColor.r+(highColor.r−lowColor.r)*phase;

estimate.g=lowColor.g+(highColor.g−lowColor.g)*phase;

estimate.b=lowColor.b+(highColor.b−lowColor.b)*phase;

The reason the algorithm looks at green is because green is held to be the best original indicator of the edge. Red and blue channels are more likely to get moved with respect to green in lateral chromatic aberration.

Computing an Initial Area of Effect

Figure 20B:
FIG. 20B is an exemplary initial area of effect for the defringing of the exemplary image of FIG. 17A.
Figure 20A:
FIG. 20A is an exemplary initial estimate for the defringed color of the exemplary image of FIG. 17A.

Image 2000 of FIG. 20A represents an initial estimate of the defringed color in exemplary image 1700. When the algorithm estimates the defringed color, this estimate has a value that is more reliable near the edge than away from the edge. This is partly because the direction information is most reliable near the edge (it is random in regions not containing an edge). It is also partly because of the way the weights 'roll off' near-edge pixels when the high and low color averages are computed.

Because of this, the algorithm may evaluate an area of effect that has the greatest value near the edge and rolls off smoothly in regions away from the edge. The algorithm may use the same technique to evaluate this roll off as was used for the roll offs in the high and low color average computation. In other words, the process may sum the high-side bits before and after the center pixel. If the s8 pixel is on the edge, one sum will be 0 and the other sum will be 7. The algorithm may then calculate the absolute value of the difference between these sums, then divide it by 7, i.e., the value that the absolute value sum difference will take on if s8 is exactly on the edge. This produces a value that has a 1.0 value near the edge and drops precipitously away from the edge.

Image 2050 of FIG. 20B represents an initial area of effect for the defringing of exemplary image 1700.

Areas Needing Further Desaturation

The algorithm's estimate for the defringed color is not always perfect. This is because the desired color may not actually be present locally. This occurs, e.g., in the 'notch-up' case (see the '638 application incorporated by reference for further details regarding the 'notch-up' case). The 'notch-up' case occurs when a fairly thin (up to 5 pixels) line appears that is lighter than its surrounding area. Image 2100 of FIG. 21A represents an exemplary original image, while image 2110 of FIG. 21B represents the 'notch-up' region of the exemplary image, and image 2120 of FIG. 21C represents the defringed version of the exemplary image. The notch-up areas display color fringing and because of this, the original color is not present in the set of pixels that crosses the edge. The fringe affects the entire light area in the image.

Characterizing and Fixing the 'Notch-Up' Region

To characterize the notch-up region, the algorithm may look at several criteria that must be satisfied, e.g.:

1.) the central pixel's high-side bit h8 must be 1;
2.) the central pixel at position s8 must be within the edge mask;
3.) the central pixel green value >0.3;
4.) the high color average saturation is less than 0.5;
5.) the high color average is not red-hued; and
6.) the central pixel is near edges on both sides.

Most of the criteria are easy to evaluate. Some of the criteria are soft-edged as well. For example, pseudocode to evaluate criteria 1.)-5.) above is shown below:

c1=h8;

c2=edgemask;

c3=clamp((s8.g−0.3)*10.0+0.5,0.0,1.0);

lo1=min(highColor.r,min(highColor.g,highColor.b));

hi1=max(highColor.r,max(highColor.g,highColor.b));

sat=(hi1−lo1)/hi1;

c4=clamp((sat−0.5)*5.0+0.5,0.0,1.0);

c5=highColor.r<highColor.g||highColor.r<highColor.b;

For criteria 6.), the algorithm amy evaluate nearness to the edge on both sides of s8, as shown in the pseudocode below:

w1=h3+h4+h5+s6+h7;

w2=h9+h10+h11+h12+h13;

c6=clamp(2.0*(1.5−w1−w2),0.0,1.0);

The notch-up region is the area where all 6 of the criteria are 1, but more specifically, according to some embodiments, the criteria are multiplied together, as shown in the pseudocode below:

notchUpRegion=$c1*c2*c3*c4*c5*c6$;

The notch-up region is added to the area of effect. The defringed color is desaturated in the notch-up region, as shown in the pseudocode below:

areaOfEffect=max(areaOfEffect,notchUpRegion);

Y=estimate.$r$*0.299+estimate.$g$*0.587+estimate.$b$*0.114;

estimate+=(color($Y,Y,Y$)−estimate)*$notchUpRegion$;

4. Preventing Artifacts

The next part of the blind defringing algorithm involves prevent image-destroying artifacts, and is specifically concerned with preventing the spreading of red colors into darker areas, as well as the preservation of flesh tones in the image.

Preventing 'Red Spread'

Figure 22:
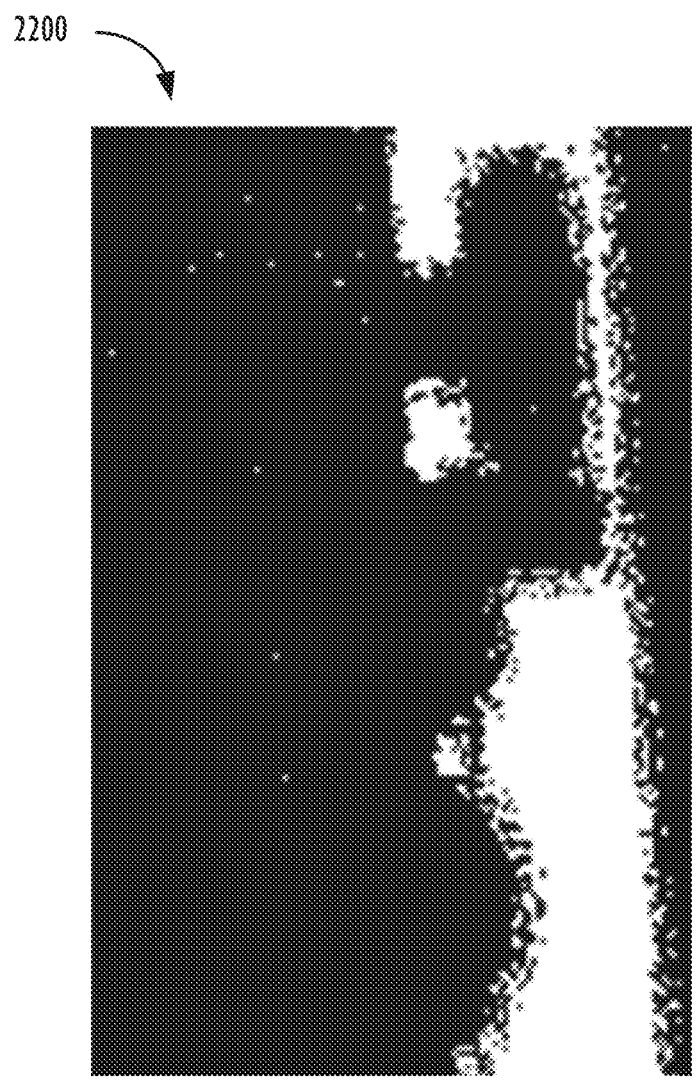
FIG. 22 is an exemplary 'red spread' prevention region for the exemplary image of FIG. 17A.

The blind defringing algorithms described herein may have the undesirable and unintended side-effect of spreading bright red colors into very dark areas in the image. Since dark-against-red edges rarely show color fringe, these areas may safely be ruled out from the defringing process. However, because reds often have little green, the algorithm may also desire to rule out neutral areas bleeding into darker red areas. To summarize, an ideal algorithm would want to prevent the defringing operation in areas where: 1.) the high color average is strongly red-hued; or 2.) the high color is dark and neutral, and the low color is red-hued, as shown in the pseudocode below:

$c1$=highColor.$r$*0.75>highColor.$g$ && highColor.$r$>highColor.$b$;

$c2$=sat<0.25 && hi1<0.3;

$c3$=lowColor.$r$*0.75>lowColor.$g$ && lowColor.$r$>lowColor.$b$;

redSpreadRegion=$c1$||($c2$ && $c3$);

To prevent 'red spread,' the algorithm may simply remove the red spread region from the area of effect. Image 2200 of FIG. 22 represents a 'red spread' prevention region for the exemplary image 1700.

Preserving Flesh Tones

While neutral, high-contrast edges often can show color fringing in a photograph, there is almost never color fringing on a human face. So, according to some embodiments, the algorithm may make an effort to preserve flesh tone regions. To do this, the algorithm may look at the center pixel's color and construct a wedge of color space that contains flesh tones. According to some embodiments, a condition is asserted that the hue of the flesh tone color must be between red and yellow. This means that the color components must be, in order from greatest to least: red, green, blue, as shown in the pseudocode below:

$c1$=$s8.r$>$s8.g$ && $s8.g$>$s8.b$.

Once it is required this criterion be met, it becomes much easier to determine hue and saturation. The algorithm requires saturation to be above a fairly low threshold and below a fairly high threshold. If the wedge between red and yellow is considered to be the range 0.0 . . . 1.0, then the hue may be constrained to be the range 0.05 . . . 0.5, which keeps the face from being spectral red and stops at orange. If a face is 'blown out' and exhibits harsh contrasts and perhaps yellows and whites, then a fringe could potentially occur. Finally, deep shadow colors are prevented from being considered to be flesh tones. To preserve the flesh tones, the algorithm may also remove the flesh tone region from the area of effect, as shown in the pseudocode below:

$c$sat=($s8.r$−$s8.b$)/$s8.r$;

$c2$=$c$sat>0.12 && $c$sat<0.8;

$c$hue=($s8.g$−$s8.b$)/($s8.r$−$s8.b$);

$c3$=$c$hue>0.05 && $c$hue<0.5;

$c4$=$s8.r$>0.05;

fleshToneRegion=$c1*c2*c3*c4$;

areaOfEffect*=1.0−fleshToneRegion;

5. Producing the Final Result

The next part of the blind defringing algorithm involves producing the final result, including masking the defringed color to the area of effect and then attempting to match luminance with the original image.

Masking the Defringed Color Estimate

Figure 23:
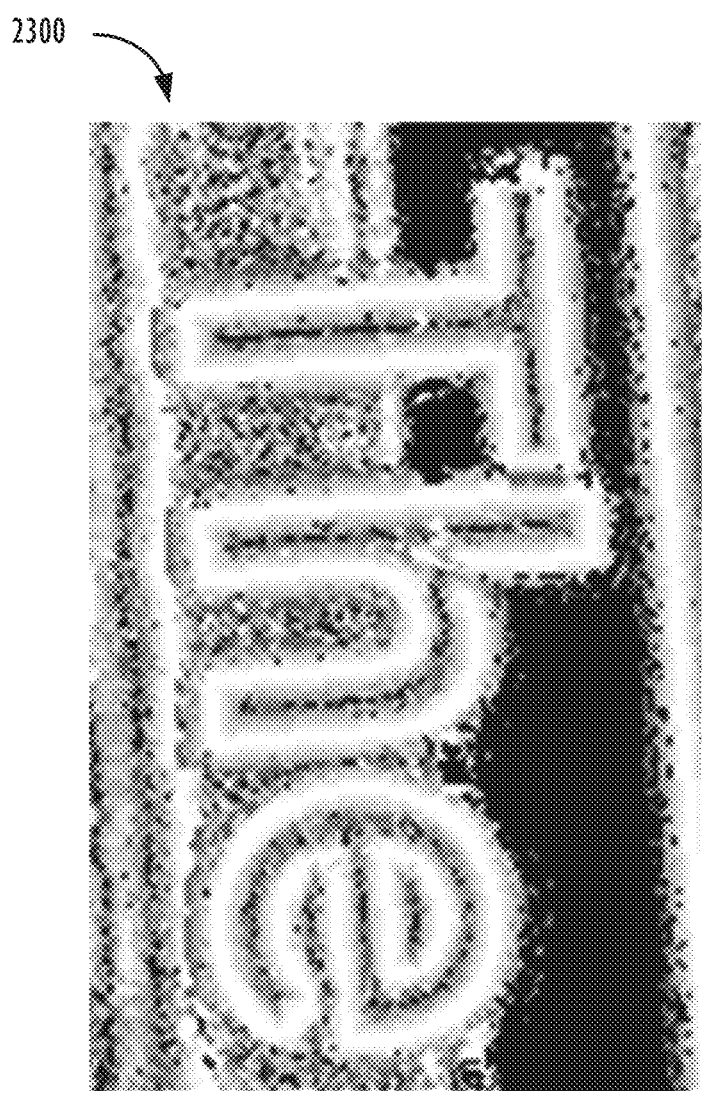
FIG. 23 is exemplary final area of effect' region for the exemplary image of FIG. 17A.

The area of effect masks the defringed color estimate to only be used in those areas where fringe is strongest, i.e., near the edge. Along the way, areas have been added that are to be processed specially, and others comprise areas that it is desirable to preserve. The algorithm may then mask the defringed color to the area of effect, as shown in the pseudocode below:

estimate=$s8$+(estimate−$s8$)*areaOfEffect;

Image 2300 of FIG. 23 represents the final area of effect' for the defringing of exemplary image 1700.

Preserving the Luminance of the Center Color

While the defringed color is generally very close to the original center color $s8$, it is sometimes the wrong luminance. Therefore the original color's luminance is measured and the defringed color's luminance is scaled to match. This operation can sometimes go awry. So the scaling may be limited to a factor, e.g., a factor of 8, and scaling may be omitted entirely when the defringed color is black, as shown in the pseudocode below:

```
iY = s8.r * 0.299 + s8.g * 0.587 + s8.b * 0.114;
Y = estimate.r * 0.299 + estimate.g * 0.587 + estimate.b * 0.114;
f = iY / Y;
if (f > 8.0 || Y == 0.0)
    estimate = s8;
else
    estimate *= f;
return estimate;
```

After luminance scaling, the algorithm will have completed the defringe operation, and the defringe color estimate may now be returned as the 'final color' to be set in the defringed image.

Figure 24:
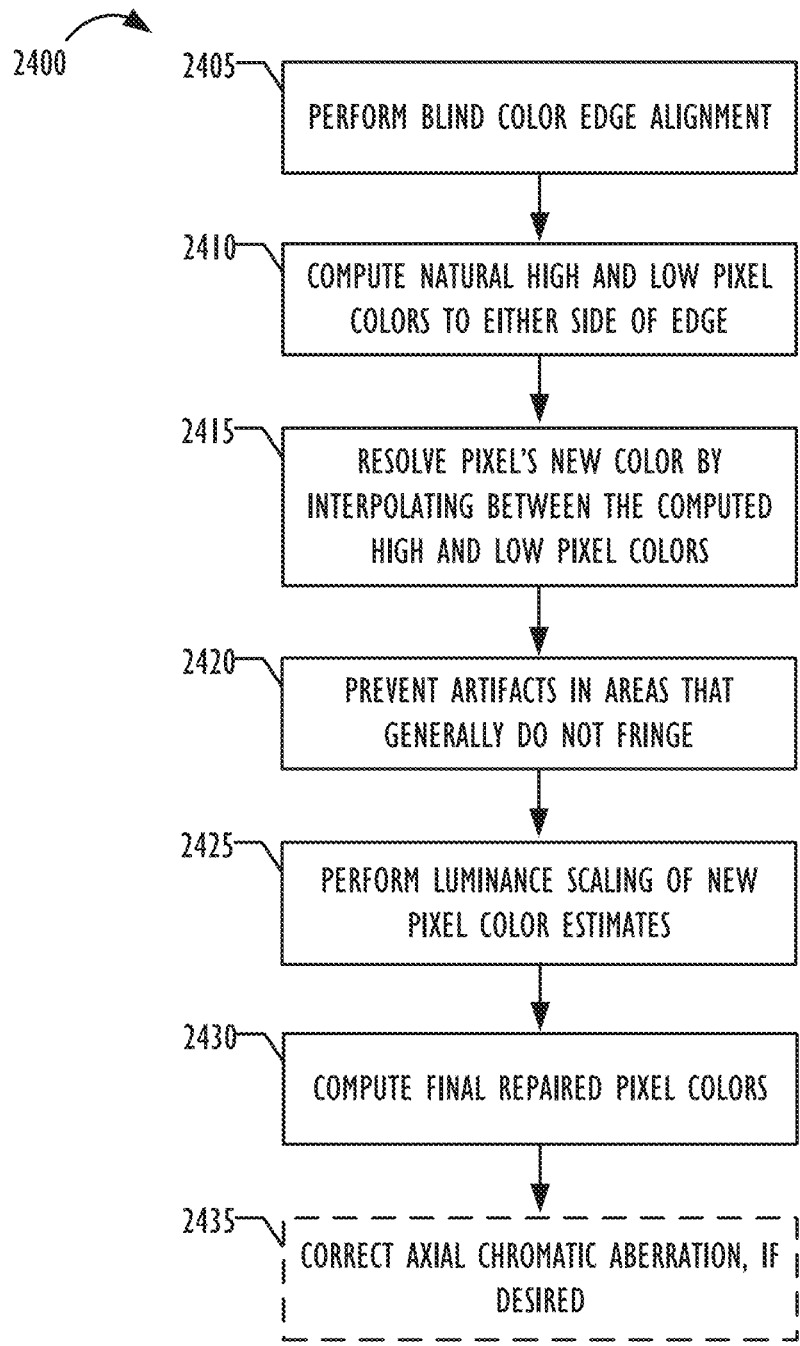
FIG. 24 is a flowchart of an exemplary process for performing blind color defringing, in accordance with one embodiment.

Referring now to FIG. 24, a method 2400 for performing blind defringing is illustrated at a high-level, in flowchart form. First, the process begins by blind color edge alignment (Step 2405). Next, the process looks at the edges and computes natural high and low colors to either side of the edge (Step 2410). The goal is to get colors that aren't contaminated by the fringe color. Next, the process resolves the pixel's estimated new color by interpolating between the low and high colors, e.g., based on the green variation across the edge and the amount of green in the pixel that is being repaired (Step 2415). Next, measures are taken to prevent artifacts in areas that generally do not fringe, like red-black boundaries and human skin tone regions (Step 2420). Next, the process performs luminance-scaling of the new color estimate (Step 2425) and uses the scaled value to compute the final repaired pixel color value (Step 2430). Finally, axial chromatic aberration may be corrected for, if so desired, using a similar process that is careful to simply ignore the colors too close to very high-contrast high-brightness edges (Step 2435).

Figure 25:
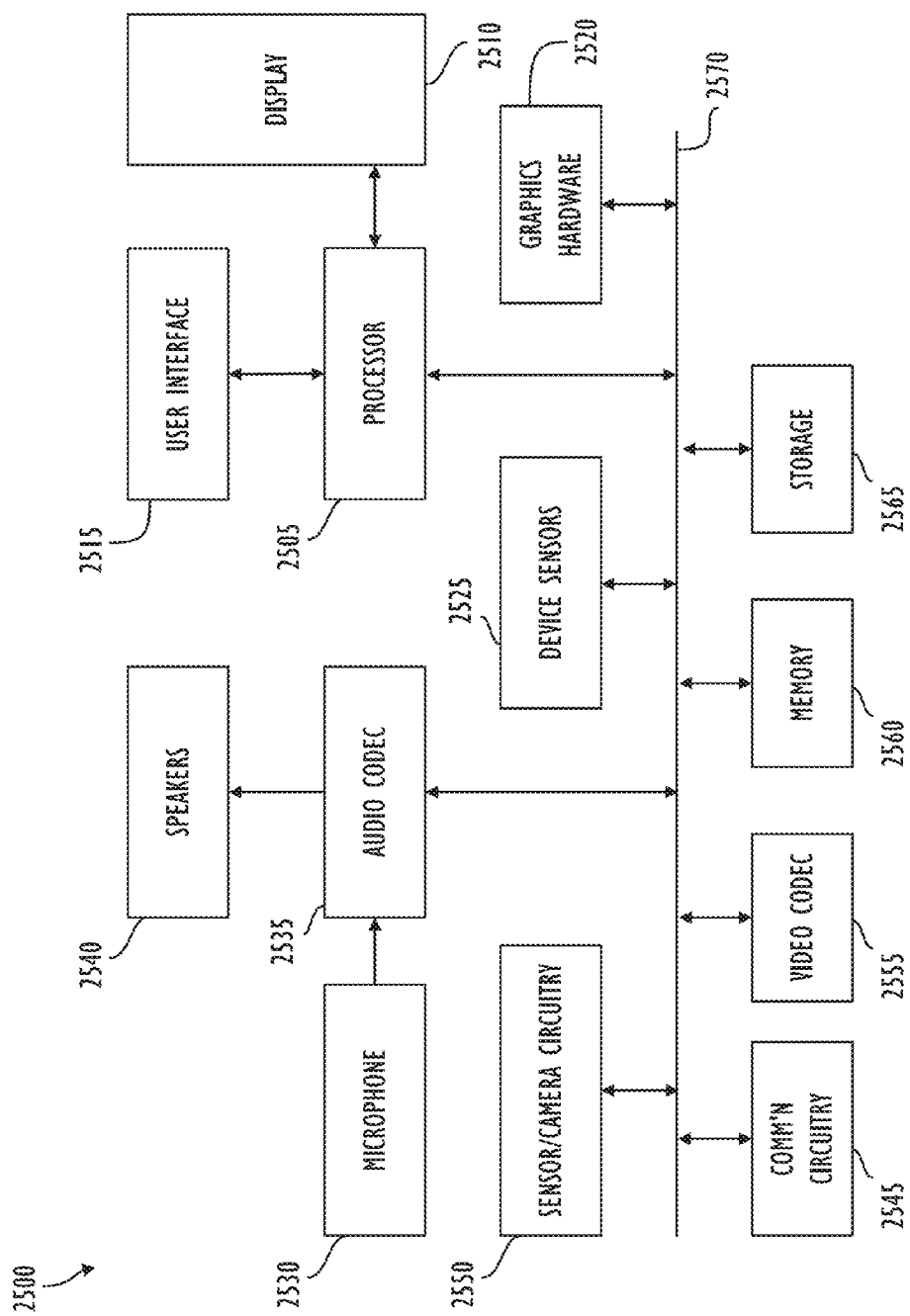
FIG. 25 is a block diagram of an illustrative electronic device, in accordance with one embodiment.

Referring now to FIG. 25, a simplified functional block diagram of illustrative electronic device 2500 is shown according to one embodiment. Electronic device 2500 may include processor 2505, display 2510, user interface 2515, graphics hardware 2520, device sensors 2525 (e.g., proximity sensor/ambient light sensor, accelerometer and/or gyroscope), microphone 2530, audio codec(s) 2535, speaker(s) 2540, communications circuitry 2545, digital image capture unit 2550, video codec(s) 2555, memory 2560, storage 2565, and communications bus 2570. Electronic device 2500 may be, for example, a personal digital assistant (PDA), personal music player, mobile telephone, notebook, laptop or tablet computer, desktop computer, or server computer. More particularly, the operations described above may be performed on a device that takes the form of device 2500.

Processor 2505 may execute instructions necessary to carry out or control the operation of many functions performed by device 2500. Processor 2505 may, for instance, drive display 2510 and receive user input from user interface 2515. User interface 2515 can take a variety of forms, such as a button, keypad, dial, a click wheel, keyboard, display screen and/or a touch screen. Processor 2505 may also, for example, be a system-on-chip such as those found in mobile devices and include a dedicated graphics processing unit (GPU). Processor 2505 may be based on reduced instruction-set computer (RISC) or complex instruction-set computer (CISC) architectures or any other suitable architecture and may include one or more processing cores. Graphics hardware 2520 may be special purpose computational hardware for processing graphics and/or assisting processor 2505 to process graphics information. In one embodiment, graphics hardware 2520 may include a programmable graphics processing unit (GPU).

Sensor and camera circuitry 2550 may capture still and video images that may be processed, at least in part, by video codec(s) 2555 and/or processor 2505 and/or graphics hardware 2520, and/or a dedicated image processing unit incorporated within circuitry 2550. Images so captured may be stored in memory 2560 and/or storage 2565. Memory 2560 may include one or more different types of media used by processor 2505 and graphics hardware 2520 to perform device functions. For example, memory 2560 may include memory cache, read-only memory (ROM), and/or random access memory (RAM). Storage 2565 may store media (e.g., audio, image and video files), computer program instructions or software, preference information, device profile information, and any other suitable data. Storage 2565 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 2560 and storage 2565 may be used to tangibly retain computer program instructions or code organized into one or more modules and written in any desired computer programming language. When executed by, for example, processor 2505 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled.

The invention claimed is:

1. A non-transitory program storage device, readable by a processor and comprising instructions stored thereon to cause the processor to:

obtain image data representative of a first image, the image data comprising a plurality of pixels, each pixel in the plurality comprising a first plurality of pixel color values;

obtain a direction map for the first image, the direction map having a corresponding value for each pixel in the plurality;

obtain an edge map for the first image, the edge map having a corresponding value for each pixel in the plurality;

perform blind color edge alignment on the first image utilizing at least the direction map for the first image and the edge map for the first image;

compute a natural high pixel color value and a natural low pixel color value for a first pixel color value of a first pixel in the first image based, at least in part, on pixel color values of pixels in a first neighborhood of pixels around the first pixel, wherein at least one pixel in the first neighborhood of pixels is located on a first side of a first edge in the first image, and wherein at least one pixel in the first neighborhood of pixels is located on a second side of the first edge in the first image;

compute an interpolated new pixel color value for the first pixel color value of the first pixel by interpolating between the computed natural high pixel color value and the computed natural low pixel color value for the first pixel color value of the first pixel; and store the interpolated new pixel color value in a memory.

2. The non-transitory program storage device of claim 1, wherein the pixels comprising the first neighborhood of pixels lie in a direction approximately perpendicular to a direction of the first edge.

3. The non-transitory program storage device of claim 1, further comprising instructions stored thereon to cause the processor to:

prevent artifacts in areas that generally do not fringe.

4. The non-transitory program storage device of claim 3, wherein the areas that generally do not fringe comprise areas where: a high color average is strongly red-hued; a high color is dark and neutral and a low color is red-hued; there is a red-black boundary; or there is a skin tone region.

5. The non-transitory program storage device of claim 1, further comprising instructions stored thereon to cause the processor to:
perform luminance scaling on the interpolated new pixel color value before executing the instructions stored thereon to cause the processor to store the interpolated new pixel color value in a memory.

6. The non-transitory program storage device of claim 1, further comprising instructions stored thereon to cause the processor to:
perform axial chromatic aberration correction on the first image based, at least in part, on input from a user-accessible control.

7. The non-transitory program storage device of claim 1, further comprising instructions stored thereon to cause the processor to:
find a peak pixel color value within the first neighborhood of pixels.

8. A method of defringing images, comprising:
obtaining image data representative of a first image, the image data comprising a plurality of pixels, each pixel in the plurality comprising a first plurality of pixel color values;
obtaining a direction map for the first image, the direction map having a corresponding value for each pixel in the plurality;
obtaining an edge map for the first image, the edge map having a corresponding value for each pixel in the plurality;
performing blind color edge alignment on the first image utilizing at least the direction map for the first image and the edge map for the first image;
computing a natural high pixel color value and a natural low pixel color value for a first pixel color value of a first pixel in the first image based, at least in part, on pixel color values of pixels in a first neighborhood of pixels around the first pixel,
wherein at least one pixel in the first neighborhood of pixels is located on a first side of a first edge in the first image, and
wherein at least one pixel in the first neighborhood of pixels is located on a second side of the first edge in the first image;
computing an interpolated new pixel color value for the first pixel color value of the first pixel by interpolating between the computed natural high pixel color value and the computed natural low pixel color value for the first pixel color value of the first pixel; and
storing the interpolated new pixel color value in a memory.

9. The method of claim 8, wherein the pixels comprising the first neighborhood of pixels lie in a direction approximately perpendicular to a direction of the first edge.

10. The method of claim 8, further comprising:
preventing artifacts in areas that generally do not fringe.

11. The method of claim 10, wherein the areas that generally do not fringe comprise areas where: a high color average is strongly red-hued; a high color is dark and neutral and a low color is red-hued; there is a red-black boundary; or there is a skin tone region.

12. The method of claim 8, further comprising:
performing luminance scaling on the interpolated new pixel color value before storing the interpolated new pixel color value in a memory.

13. The method of claim 8, further comprising:
finding a peak pixel color value within the first neighborhood of pixels.

14. A device, comprising:
a memory;
a display; and
one or more processors operatively coupled to the memory and the display and configured to execute program code stored in the memory to:
obtain image data representative of a first image, the image data comprising a plurality of pixels, each pixel in the plurality comprising a first plurality of pixel color values;
obtain a direction map for the first image, the direction map having a corresponding value for each pixel in the plurality;
obtain an edge map for the first image, the edge map having a corresponding value for each pixel in the plurality;
perform blind color edge alignment on the first image utilizing at least the direction map for the first image and the edge map for the first image;
compute a natural high pixel color value and a natural low pixel color value for a first pixel color value of a first pixel in the first image based, at least in part, on pixel color values of pixels in a first neighborhood of pixels around the first pixel,
wherein at least one pixel in the first neighborhood of pixels is located on a first side of a first edge in the first image, and
wherein at least one pixel in the first neighborhood of pixels is located on a second side of the first edge in the first image;
compute an interpolated new pixel color value for the first pixel color value of the first pixel by interpolating between the computed natural high pixel color value and the computed natural low pixel color value for the first pixel color value of the first pixel; and
store the interpolated new pixel color value in the memory.

15. The device of claim 14, wherein the pixels comprising the first neighborhood of pixels lie in a direction approximately perpendicular to a direction of the first edge.

16. The device of claim 14, wherein the one or more processors are further configured to execute program code stored in the memory to:
prevent artifacts in areas that generally do not fringe.

17. The device of claim 16, wherein the areas that generally do not fringe comprise areas where: a high color average is strongly red-hued; a high color is dark and neutral and a low color is red-hued; there is a red-black boundary; or there is a skin tone region.

18. The device of claim 14, wherein the one or more processors are further configured to execute program code stored in the memory to:
perform luminance scaling on the interpolated new pixel color value before executing the program code stored in the memory to store the interpolated new pixel color value in the memory.

19. The device of claim 14, wherein the one or more processors are further configured to execute program code stored in the memory to:
perform axial chromatic aberration correction on the first image based, at least in part, on input from a user-accessible control.

20. The device of claim 14, wherein the one or more processors are further configured to execute program code stored in the memory to:
   find a peak pixel color value within the first neighborhood of pixels.

* * * * *